(12) United States Patent
Taguchi et al.

(10) Patent No.: US 7,850,242 B2
(45) Date of Patent: Dec. 14, 2010

(54) VEHICLE SEATS

(75) Inventors: Yohei Taguchi, Kariya (JP); Chikanori Fujita, Kirishima (JP); Hiroki Kusanagi, Kirishima (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 295 days.

(21) Appl. No.: 12/046,191

(22) Filed: Mar. 11, 2008

(65) Prior Publication Data

US 2008/0224522 A1     Sep. 18, 2008

(30) Foreign Application Priority Data

Mar. 14, 2007  (JP)  ............... 2007-064933
Oct. 9, 2007   (JP)  ............... 2007-263269

(51) Int. Cl.
*B60N 2/24* (2006.01)

(52) U.S. Cl. .................. 297/344.24; 297/344.23; 296/65.06

(58) Field of Classification Search .......... 297/344.21, 297/344.22, 344.23, 344.24; 296/65.06, 296/65.07, 65.11, 65.12
See application file for complete search history.

(56) References Cited

U.S. PATENT DOCUMENTS

| | | | | |
|---|---|---|---|---|
| 4,600,239 A | * | 7/1986 | Gerstein et al. | 297/344.23 |
| 4,846,529 A | * | 7/1989 | Tulley | 297/344.23 |
| 5,524,952 A | * | 6/1996 | Czech et al. | 296/65.12 |
| 6,543,848 B1 | * | 4/2003 | Suga et al. | 297/344.24 |
| 6,557,919 B2 | * | 5/2003 | Suga et al. | 296/65.07 |
| 6,962,383 B2 | * | 11/2005 | Takenoshita et al. | 296/65.03 |
| 7,316,441 B2 | * | 1/2008 | Iwatani et al. | 296/65.12 |
| 7,399,035 B2 | * | 7/2008 | Kusanagi et al. | 296/65.07 |
| 2006/0255640 A1 | | 11/2006 | Kusanagi et al. | |
| 2007/0222267 A1 | * | 9/2007 | Tsujimoto et al. | 297/344.24 |

FOREIGN PATENT DOCUMENTS

JP    2001-97081    4/2001
JP    2004-249818   9/2004

* cited by examiner

*Primary Examiner*—Peter R. Brown
(74) *Attorney, Agent, or Firm*—Patterson Thuente Christensen Pedersen, P.A.

(57) ABSTRACT

A vehicle seat may include a seat main body, a rotation mechanism that is arranged and constructed to horizontally rotate the seat main body between a forwardly facing position and a laterally facing position, a sliding mechanism, and a rotation locking mechanism. The rotation locking mechanism is arranged and constructed to prevent the seat main body from rotating when the seat main body is in a laterally facing position. The rotation locking mechanism includes a first engagement portion, a second engagement portion, and a lock releasing portion. The second engagement portion is capable of moving between a condition in which it does not engage the first engagement portion and a position in which it engages the first engagement portion when the seat main body is in the laterally facing position. The lock releasing portion is arranged and constructed to be engaged with and disengaged from the second engagement portion depending upon the sliding motion of the sliding mechanism.

6 Claims, 14 Drawing Sheets

VEHICLE SEATS

This application claims priority to Japanese patent application serial numbers 2007-64933 and 2007-263269, the contents of which are incorporated herein by reference.

BACKGROUND OF THE INVENTION

This invention relates to a vehicle seat in which an elderly person, a physically handicapped person or other such persons (hereinafter simply referred to as "occupant") is capable of easy getting in and out of a vehicle.

A conventional vehicle seat includes a seat main body, a rotation mechanism that can horizontally rotate the seat main body between a forwardly facing position where it faces a front side of a vehicle and a laterally facing position where it faces a door opening of the vehicle, a sliding mechanism that can slide the seat main body in forward and rearward directions relative to the rotation mechanism while the seat main body is in the laterally facing position, and a rotation locking mechanism that can restrict or prevent the seat main body from rotating when the seat main body is in the forwardly facing position or the laterally facing position. According to the vehicle seat thus constructed, the seat main body can be locked at the laterally facing position. Therefore, the seat main body can be stably moved between vehicle interior and vehicle exterior via the door opening when the seat main body is rotated to the laterally facing position. As a result, an occupant can easily get in and out of the vehicle.

Various types of rotation locking mechanisms are known. Such rotation locking mechanisms are taught, for example, by Japanese Laid-Open Patent Publication Number 2001-97081. The known rotation locking mechanism taught by Japanese Laid-Open Patent Publication Number 2001-97081 includes first and second engagement members that are attached to a vehicle floor so as to respectively correspond to the forwardly facing position body. In the known rotation locking mechanism, the engaging member of the seat main body is arranged and constructed to elastically engage the first or second engagement member of the vehicle floor when the seat main body is rotated to the forwardly facing position or the laterally facing position, so that the seat main body can be locked at the forwardly facing position or the laterally facing position. Further, the engaging member is arranged and constructed to be disengaged from the first or second engagement member by means of an actuator, so that the seat main body can be unlocked so as to be freely rotated.

Further, a different type of rotation locking mechanism is also known. Such a rotation locking mechanism includes a stopper member that is attached to a vehicle floor so as to correspond to the laterally facing position, and a contact member that is attached to the seat main body. In this rotation locking mechanism, the contact member of the seat main body is arranged and constructed to be pressed to the stopper member by means of a driving force of the rotation mechanism of the seat main body when the contact member contacts the stopper member, so that the seat main body can be locked at the laterally facing position.

However, the known rotation locking mechanisms still are in need of improvement. Thus, there is a need in the art for an improved rotation locking mechanism.

BRIEF SUMMARY OF THE INVENTION

For example, in one embodiment of the present invention, a vehicle seat may include a seat main body, a rotation mechanism that is arranged and constructed to horizontally rotate the seat main body between a forwardly facing position and a laterally facing position, a sliding mechanism, and a rotation locking mechanism. The sliding mechanism is arranged and constructed to move the seat main body toward vehicle exterior or vehicle interior relative to the rotation mechanism when the seat main body is in the laterally facing position. The rotation locking mechanism is arranged and constructed to prevent the seat main body from rotating when the seat main body is in the laterally facing position. The rotation mechanism includes a support base that is unrotatably positioned on a vehicle floor, and a rotatable base that is rotatably coupled to the support base and is coupled to sliding mechanism. The sliding mechanism includes a slide portion that is coupled to the seat main body and is capable of sliding toward the vehicle exterior or the vehicle interior. The rotation locking mechanism includes a first engagement portion that is attached to a side corresponding to the support base of the rotation mechanism, a second engagement portion that is attached to a side corresponding to the rotatable base of the rotation mechanism, and a lock releasing portion that is attached to the slide portion of the sliding mechanism. The second engagement portion of the rotation locking mechanism is capable of moving between a condition in which it does not engage the first engagement portion and a condition in which it engages the first engagement portion when the seat main body is in the laterally facing position. The lock releasing portion of the rotation locking mechanism is arranged and constructed to be engaged with and disengaged from the second engagement portion depending upon the sliding motion of the slide portion of the sliding mechanism.

According to the vehicle seat thus constructed, even if a large external force is laterally applied to the seat main body when the seat main body is moved toward the vehicle interior or the vehicle exterior, such an external force can be effectively received or absorbed by the rotation locking mechanism because the second engagement portion of the rotation locking mechanism can be maintained in a locking condition. In other words, the external force applied to the seat main body can be effectively prevented from being transmitted to the rotation mechanism. As a result, the rotation mechanism can be effectively prevented from being damaged by the external force.

Further, the lock releasing portion of the rotation locking mechanism is attached to the slide portion of the sliding mechanism. Therefore, the rotation locking mechanism can be automatically switched between a locking condition and an unlocking condition depending upon the sliding motion of the slide portion. Therefore, an additional actuator is not required in order to move the rotation locking mechanism.

Other objects, features, and advantages, of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Two detailed representative embodiments of the present teachings will now be described in further detail with reference to FIGS. 1 to 14.

First Detailed Representative Embodiment

A first embodiment of the present invention will be described with reference to FIGS. 1 to 11.

Figure 1:
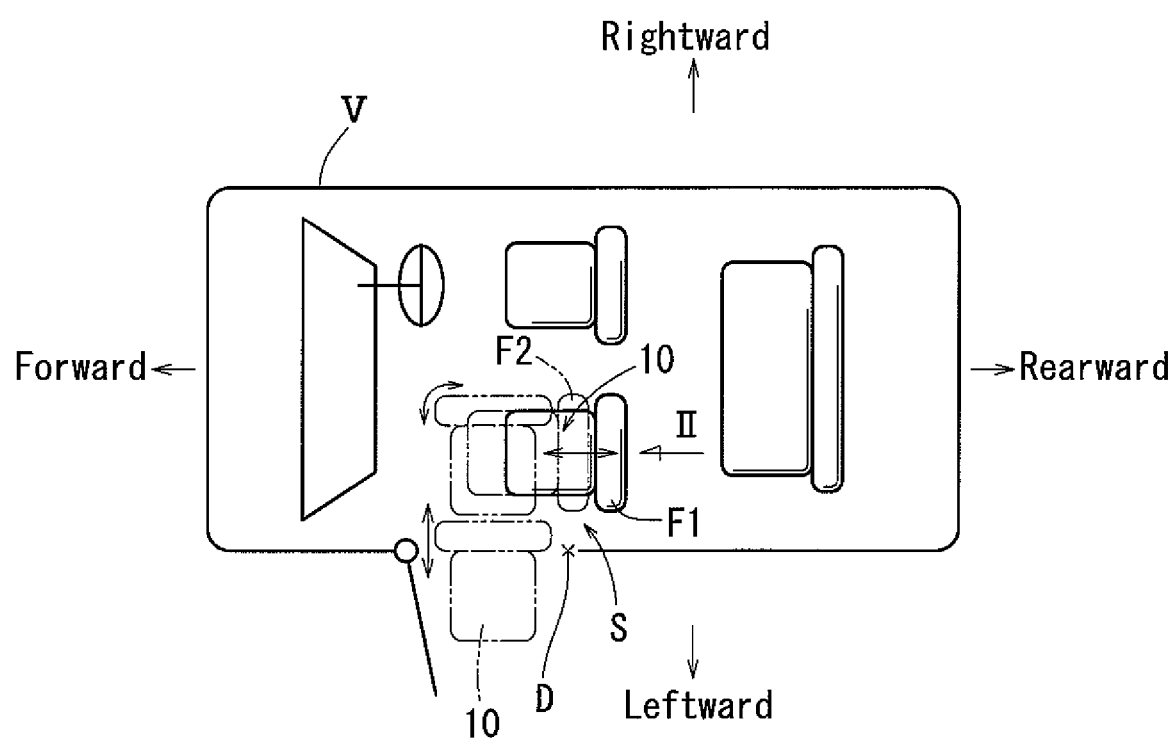
FIG. 1 is a plan view of a vehicle having a vehicle seat according to a first embodiment of the present invention.
Figure 3:
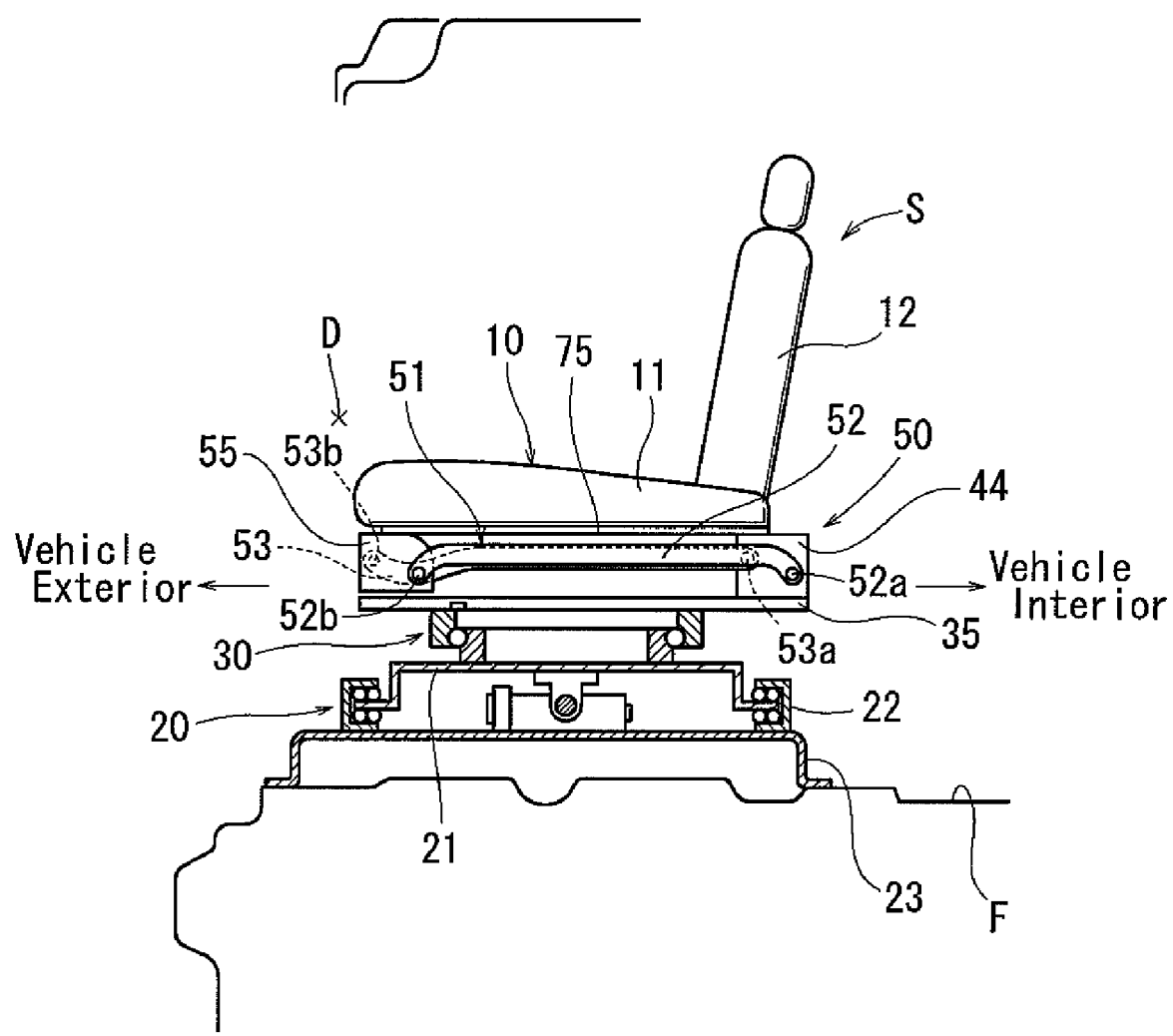
FIG. 3 is a side view of the vehicle seat, which illustrates movement of the vehicle seat.
Figure 4:
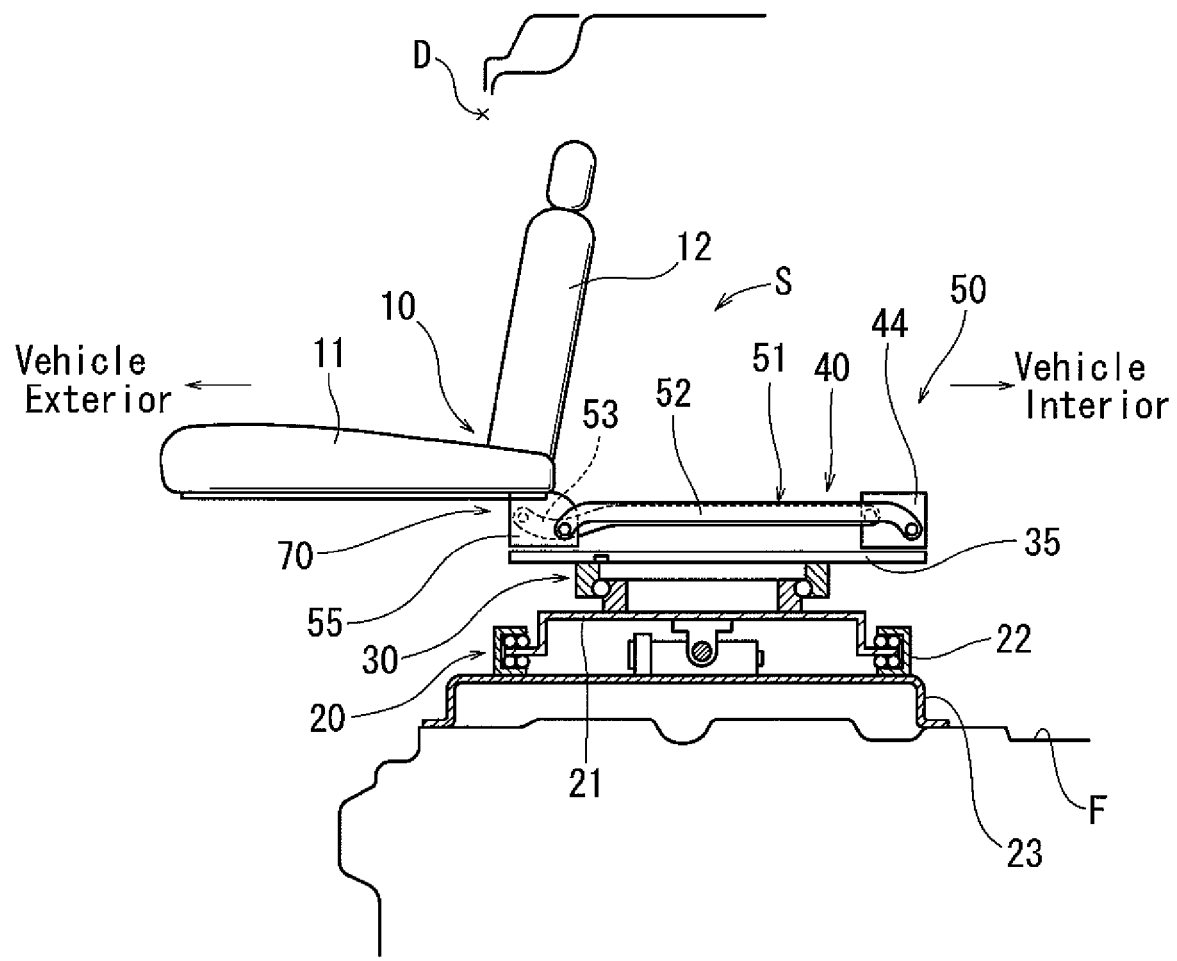
FIG. 4 is a side view of the vehicle seat, which illustrates the movement of the vehicle seat.
Figure 5:
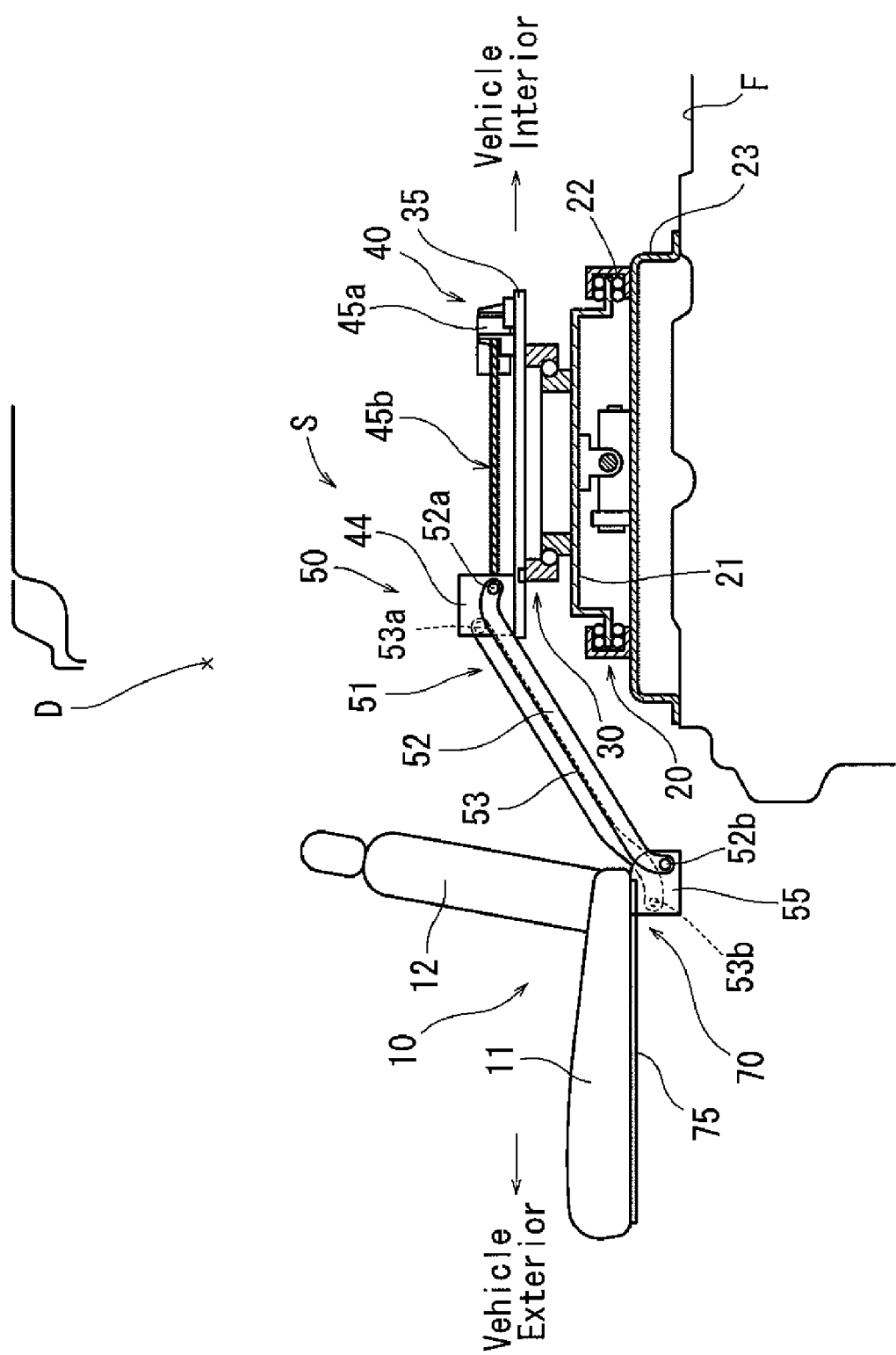
FIG. 5 is a side view of the vehicle seat, which illustrates the movement of the vehicle seat.

As shown in FIG. 1, a passenger seat of a vehicle V is exemplified as a vehicle seat S according to the first embodiment. In the vehicle seat S, a seat main body 10 thereof can horizontally move or rotate between a forwardly facing position where it faces forwardly of the vehicle V and a laterally facing position where it faces a door opening D of the vehicle V. Further, the seat main body 10 can laterally move at the laterally facing position, so as to move between vehicle interior and vehicle exterior via the door opening D (FIGS. 3 and 4). Further, the seat main body 10 can vertically move (i.e., move up and down) in the vehicle exterior, so as to move between an upper position and a lower position (FIGS. 4 and 5). As will be recognized, when the seat main body 10 is in the lower position, a person can easily get in and out of the seat main body 10.

When the person gets out of the vehicle V, the seat main body 10 is moved from the vehicle interior to the vehicle exterior after it is rotated to the laterally facing position in the vehicle interior. Thereafter, the seat main body 10 is moved downwardly toward the lower position such that the person can get out of the seat main body 10. This allows the person to get out of the vehicle V. To the contrary, when the person gets into the vehicle V, the seat main body 10 is moved to the lower position such that the person can get in the seat main body 10. After the person gets in and sits on the seat main body 10, the seat main body 10 is moved in the reverse order. This allows the person to get into the vehicle V.

In order to move the seat main body 10 as described above, the vehicle seat S may preferably include a longitudinal sliding mechanism 20 disposed on a vehicle floor F, a rotation mechanism 30 that is disposed on the longitudinal sliding mechanism 20, a vertically moving mechanism 50 that is disposed on the rotation mechanism 30, a main or first lateral sliding mechanism 70 that is disposed on the vertically moving mechanism 50, and a rotation locking mechanism 80 (FIG. 6) that can restrict rotational motion of the rotation mechanism 30.

Figure 2:
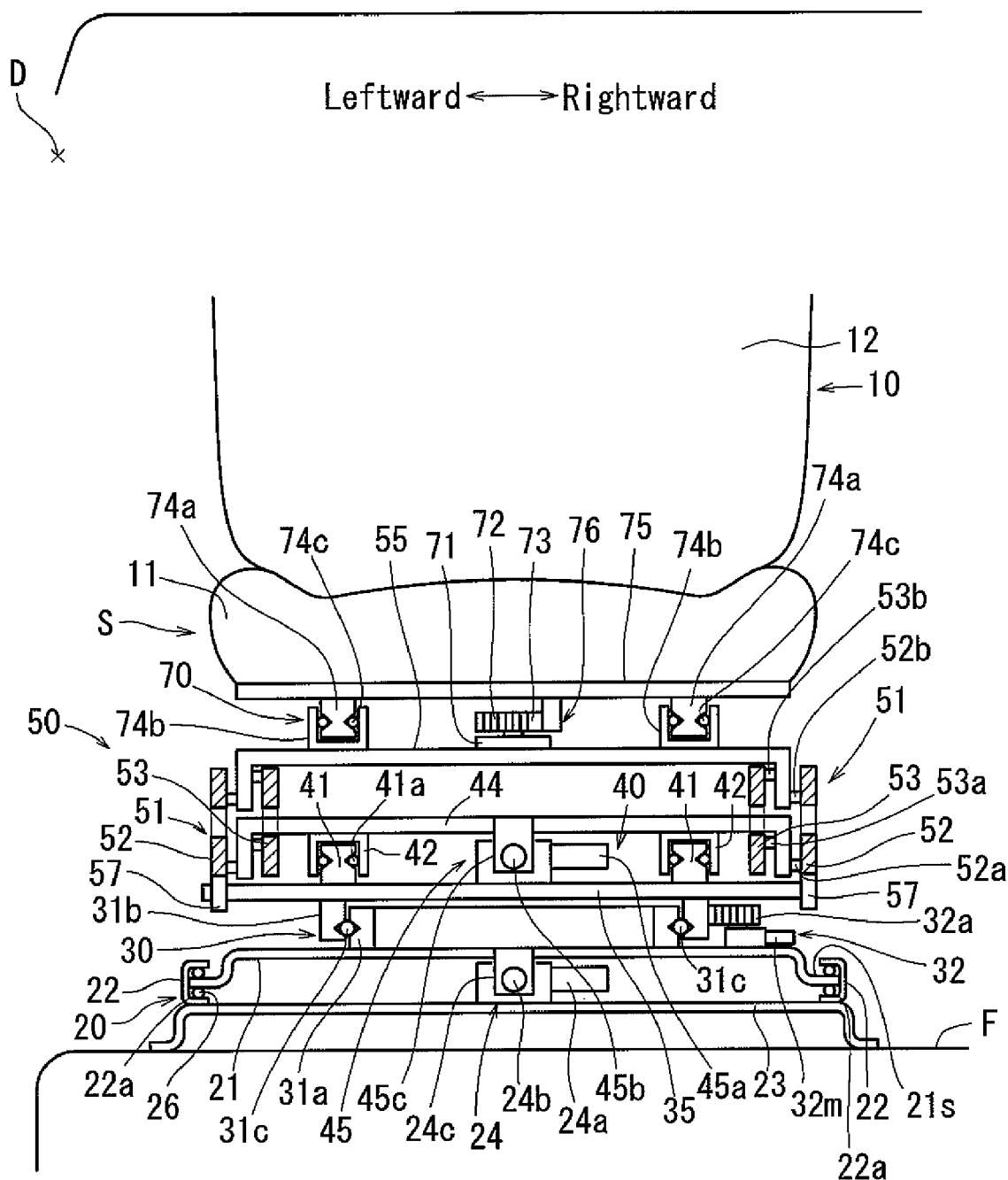
FIG. 2 is rear view of the vehicle seat, which is viewed along an arrow II of FIG. 1.
Figure 6:
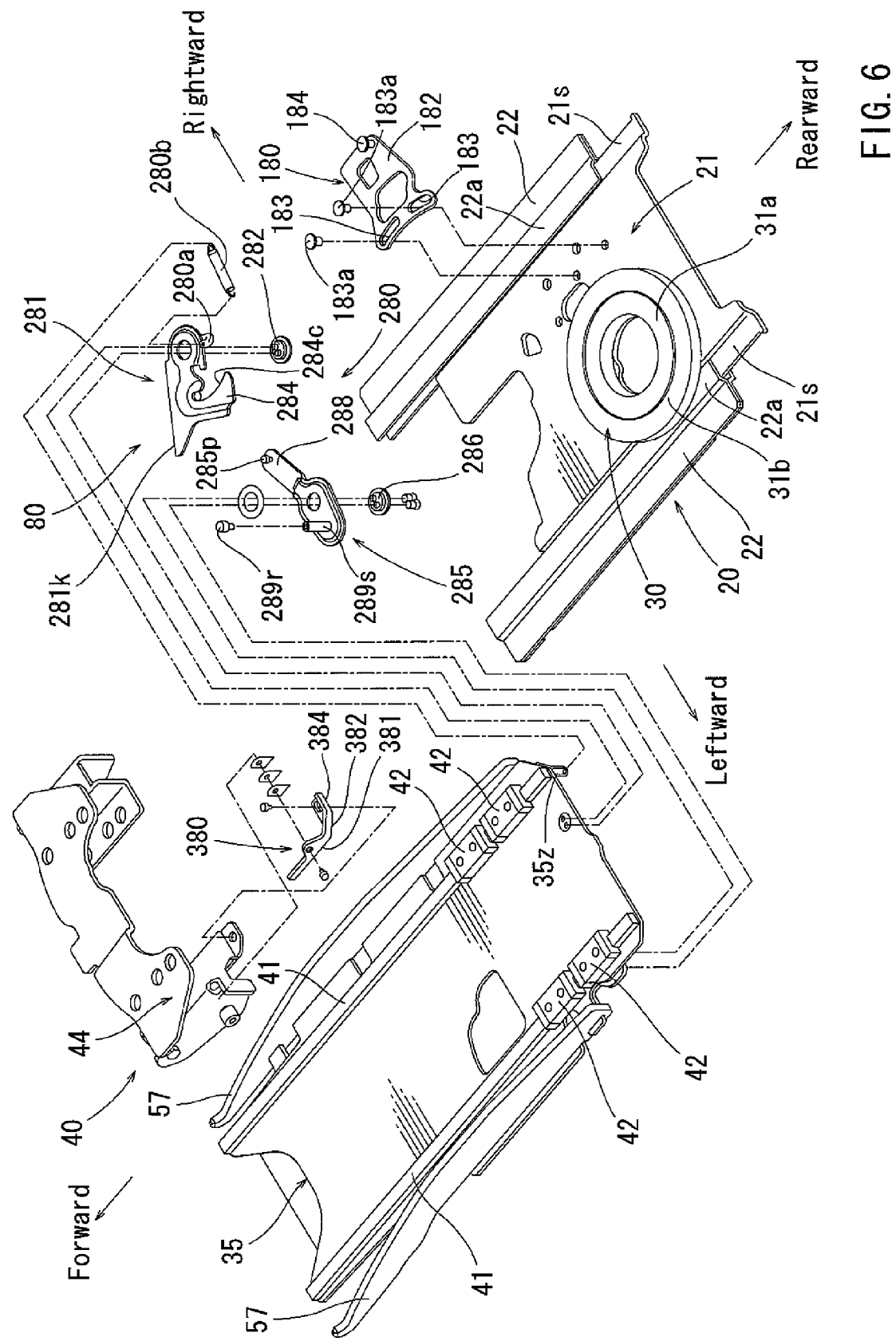
FIG. 6 is an exploded perspective view of a rotation locking mechanism of the vehicle seat.

The longitudinal sliding mechanism 20 is intended to move the seat main body 10 forward and rearward relative to the vehicle in the vehicle interior. As shown in FIGS. 2 and 6, the longitudinal sliding mechanism 20 includes a pair of stationary rails 22, a longitudinal slide base 21 and a driving mechanism 24 as a drive source of the longitudinal sliding mechanism 20. The stationary rails 22 are fixedly attached to a stationary base 23 mounted on the vehicle floor F, so as to longitudinally extend in parallel with each other. The longitudinal slide base 21 longitudinally slidably engages the stationary rails 22.

As best shown in FIG. 2, the stationary rails 22 have engagement recesses 22a having a U-shape in cross section. Conversely, the longitudinal slide base 21 has a pair of linear engagement portions 21s that are formed in longitudinal peripheries thereof. The engagement portions 21s of the longitudinal slide base 21 engage the engagement recesses 22a while a plurality of bearing balls 26 are interleaved therebetween, so that the longitudinal slide base 21 can smoothly slide with respect to the stationary rails 22.

The driving mechanism 24 may preferably include a drive motor 24a attached to the stationary base 23, a threaded shaft 24b that is rotatably positioned on the stationary base 23, and a nut 24c that is fixedly attached to the longitudinal slide base 21. The threaded shaft 24b is positioned in parallel with the stationary rails 22. One end of the threaded shaft 24b is coaxially coupled to a drive shaft (not shown) of the drive motor 24a, so that the threaded shaft 24b can be rotated by the drive motor 24a. Further, the threaded shaft 24b threadably engages the nut 24c such that the nut 24c can move along the threaded shaft 24b when the threaded shaft 24b is rotated by the drive motor 24a. Therefore, when the drive motor 24a is rotated in normal and reverse directions, the longitudinal slide base 21 can move forward and backward relative to the vehicle V along the stationary rails 22.

The rotation mechanism 30 is intended to rotate the seat main body 10 between the forwardly facing position and the laterally facing position for an angular range of approximately 90 degrees in the vehicle interior. As shown in FIGS. 2 and 6, the rotation mechanism 30 may preferably include an inner wheel 31a (support base) that is fixedly disposed on the longitudinal slide base 21 of the longitudinal sliding mechanism 20, an outer wheel 31b (rotatable base) that is positioned around the inner wheel 31a so as to be rotatable therearound, a rotation base 35 that is disposed on the outer wheel 31b and fixed thereto, and a driving mechanism 32 as a drive source of the rotation mechanism 30.

As shown in FIG. 2, an annular groove having a V-shape in cross section is formed in an outer circumferential surface of the inner wheel 31a. Similarly, a corresponding annular groove having a V-shape in cross section is formed in an inner circumferential surface of the outer wheel 31b. A plurality of bearing balls 31c are positioned between the V-shaped annular grooves of the inner and outer wheels 31a and 31b, so that the outer wheel 31b can smoothly rotate around the inner wheel 31a.

Figure 11:
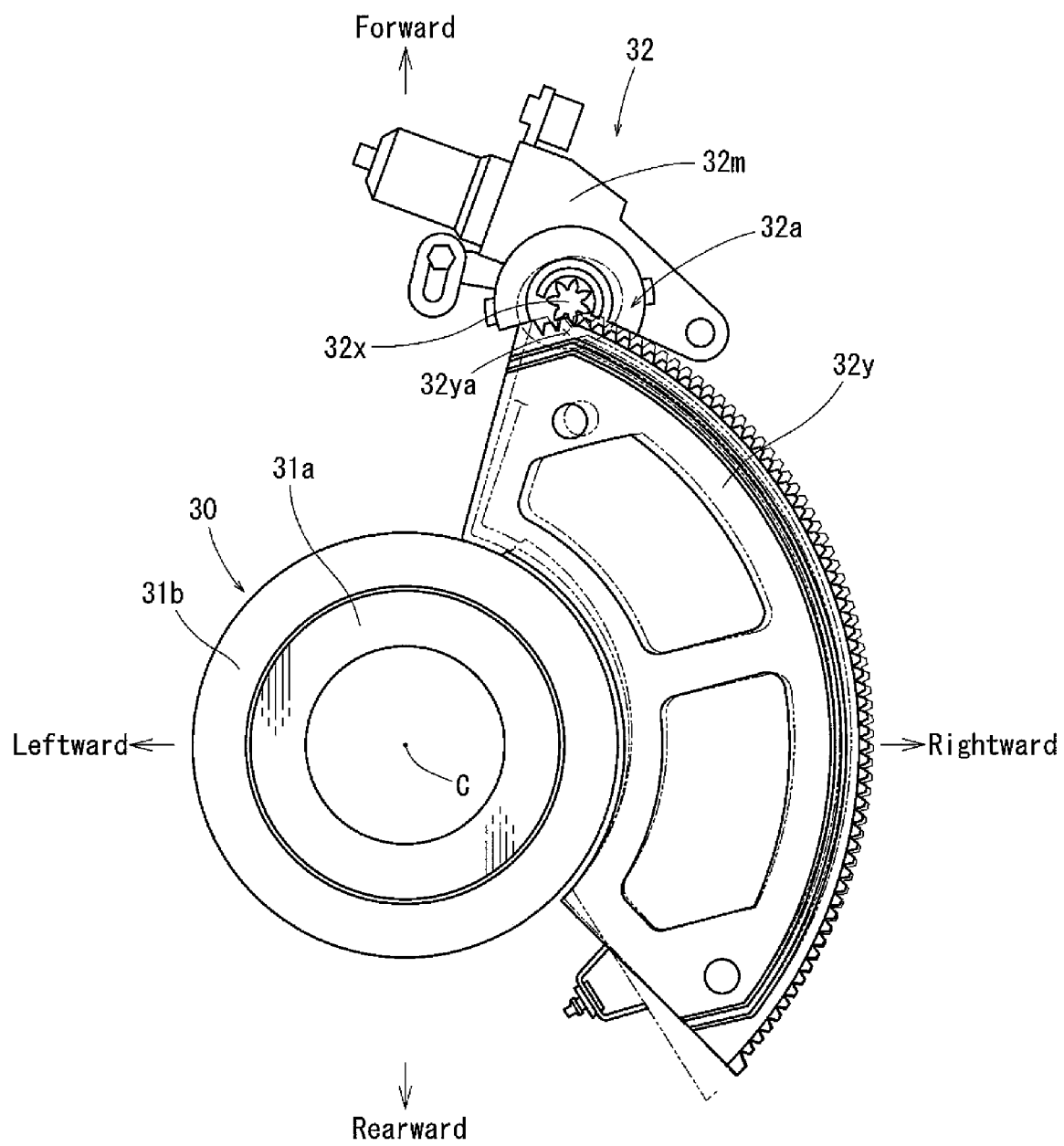
FIG. 11 is a plan view of a gear transmission mechanism of the rotation locking mechanism of the vehicle seat.

As shown in FIG. 2, the driving mechanism 32 may preferably include a drive motor 32m disposed on the longitudinal slide base 21, and a gear transmission mechanism 32a. The gear transmission mechanism 32a is arranged and constructed to transmit rotational motion of the drive motor 32m to the outer wheel 31b, thereby rotating the rotation base 35 fixedly attached to the outer wheel 31b with respect to the longitudinal slide base 21. In particular, as shown in FIG. 11, the gear transmission mechanism 32a may preferably include a first gear 32x that is connected to a drive shaft (not shown) of the drive motor 32m, and a second gear (sector gear) 32y that is associated with the outer wheel 31b. Further, the second gear 32y is concentrically positioned about the outer wheel 31b as indicated by solid lines in FIG. 11 (which position will be hereinafter referred to as a normal position thereof). That is, the second gear 32y is positioned such that a rotation center thereof is normally coincident with a rotation center C of the outer wheel 31b (the rotation mechanism 30). The first gear 32x is arranged and constructed to mesh with the second gear 32y such that the rotational motion of the drive motor 32m can be transmitted to the outer wheel 31b via the first and second gears 32x and 32y. Further, the second gear 32y is arranged and constructed to rotate the outer wheel 31b (the rotation base 35) between a first rotational position and a second rotational position, which positions respectively correspond to the forwardly facing position and the laterally facing position of the seat main body 10.

Further, as shown in FIG. 11, a specially-shaped portion 32ya may preferably be formed in one end portion of the second gear 32y. The specially-shaped portion 32ya of the second gear 32y is arranged and constructed to engage the first gear 32x when the drive motor 32m is further driven after the outer wheel 31b (the rotation base 35) is fully rotated rightwardly (i.e., clockwise in FIG. 11) to the first rotational position (FIG. 11) until the seat main body 10 reaches the forwardly facing position. Also, the specially-shaped portion 32ya is arranged and constructed to incline the second gear 32y as indicated by broken lines in FIG. 11 when it engage the first gear 32x, thereby displacing the rotation center of the second gear 32y from the rotation center C of the outer wheel 31b, i.e., eccentrically positioning the second gear 32y about the outer wheel 31b (which position will be hereinafter referred to as an inclined position thereof). Therefore, when the first gear 32x engage the specially-shaped portion 32ya of the second gear 32y, the outer wheel 31b (the rotation base 35) can be effectively prevented from rotating even if an external rotational force is applied thereto, because the specially-shaped portion 32ya of the second gear 32y engages the first gear 32x, so that the second gear 32y is eccentrically positioned about the outer wheel 31b. Thus, when the seat main body 10 is in the forwardly facing position, the rotation base 35 may preferably be rotationally locked at the first rotational position thereof by means of the gear transmission mechanism 32a and as a result, the seat main body 10 is locked at the forwardly facing position.

Further, when the drive motor 32m is driven reversely such that the outer wheel 31b (the rotation base 35) is rotated leftwardly (i.e., counterclockwise in FIG. 11) from the first rotational position toward the second rotational position, the specially-shaped portion 32ya of the second gear 32y is disengaged from the first gear 32x. As a result, the second gear 32y is returned to the normal position as indicated by solid lines in FIG. 11, so that the outer wheel 31b (the rotation base 35) can be rotationally unlocked. Therefore, when the drive motor 32m is further driven reversely, the outer wheel 31b (the rotation base 35) can freely rotate leftwardly toward the second rotational position, so that the seat main body 10 can move toward the laterally facing position.

Further, the inner wheel 31a may be referred to as a support base in the present invention. Also, the outer wheel 31b and the rotation base 35 may be referred to as a rotatable base in the present invention.

Next, the vertically moving mechanism 50 has a second lateral sliding mechanism 40, a pair of (right and left) four-bar linkage mechanisms 51, a pair of plate-shaped guide members 57 and a vertically moving base 55.

As shown in FIGS. 2 and 6, the second lateral sliding mechanism 40 may preferably include a pair of guide rails 41 that are disposed on the rotation base 35 in parallel with each other so as to extend along longitudinal peripheries thereof, slide members 42 that are respectively slidably attached to the guide rails 41, a slide base 44 seated on the slide members 42, and a driving mechanism 45 as a drive source of the slide base 44.

Each of the guide rails 41 is an elongated bar having a rectangular shape in cross section. A pair of grooves having a V-shape in cross section are formed in opposite side surfaces of the guide rails 41 so as to longitudinally extend therealong. Each of the grooves is shaped so as to be capable of receiving a plurality of bearing balls 41a therein.

Each of the slide members 42 has a U-shape in cross section. The slide members 42 slidably engage the guide rails 41 via the bearing balls 41a that are received in the V-shaped grooves of the guide rails 41.

The slide base 44 is disposed on the slide members 42 and is fixedly attached thereto. Thus, the slide base 44 is capable of longitudinally sliding along the guide rails 41 via the slide members 42.

As shown in FIG. 2, the driving mechanism 45 may preferably includes a drive motor 45a attached to the rotation base 35, a threaded shaft 45b that is rotatably positioned on the rotation base 35, and a nut 45c that is fixedly attached to the slide base 44.

The threaded shaft 45b is positioned in parallel with the guide rails 41. One end of the threaded shaft 45b is coaxially coupled to a drive shaft (not shown) of the drive motor 45a, so that the threaded shaft 45b can be rotated by the drive motor 45a. Further, the threaded shaft 45b threadably engages the nut 45c such that the nut 45c can move along the threaded shaft 45b when the threaded shaft 45b is rotated by the drive motor 45a. Therefore, when the drive motor 45a is rotated in normal and reverse directions, the slide base 44 can move along the guide rails 41 on the rotation base 35.

As shown in FIG. 2, the four-bar linkage mechanisms 51 are respectively mounted on both side portions of the slide base 44. Each of the four-bar linkage mechanisms 51 may preferably include an outer link arm 52 and an inner link arm 53. Proximal ends of the link arms 52 and 53 are respectively vertically rotatably supported on the side portions of the slide base 44 via axles 52a and 53a. Conversely, distal ends of the link arms 52 and 53 are vertically rotatably connected to side portions of the vertically moving base 55 via axles 52b and 53b (FIG. 3). That is, the link arms 52 and 53 are supported by the slide base 44 at one end and support the vertically moving base 55 at the other end. Further, the outer link arm 52 and inner link arm 53 are offset in a lateral direction in order to prevent mutual interference thereof. In addition, as shown in, for example, FIG. 3, the axles 52a and 53a are positioned spaced apart from each other. Similarly, the axles 52b and 53b are positioned spaced apart from each other.

As shown in FIGS. 2 and 6, the guide members 57 are attached to longitudinal peripheries of the rotation base 35 so as to longitudinally extend therealong. Also, the guide members 57 are arranged and constructed to slidably support the outer link arms 52 of the four-bar linkage mechanisms 51 such that the outer link arms 52 can slide therealong. (In FIGS. 3-5, the guide members 57 are omitted.)

When the slide base 44 of the second lateral sliding mechanism 40 forwardly slides from a rear-most position thereof (FIGS. 3 and 4) along the guide rails 41, the link arms 52 and 53 (the four-bar linkage mechanisms 51) can move forwardly with the slide base 44 while the outer link arms 52 contact the guide members 57. As shown in FIG. 5, when the slide base 44 comes close to a forward-most position thereof (i.e., forward ends of the guide members 57), the link arms 52 and 53 pivot or rotate downwardly about the axles 52a and 53a while the outer link arms 52 contact the forward ends of the guide members 57 (FIG. 5). At this time, the vertically moving base 55 connected to the distal ends of the link arms 52 and 53 can move downwardly while moving forwardly.

Conversely, when the slide base 44 backwardly slides along the guide rails 41, the link arms 52 and 53 (the four-bar linkage mechanisms 51) can move reversely or backwardly with the slide base 44 while the outer link arms 52 contact the guide members 57. At this time, the link arms 52 and 53 pivot or rotate upwardly about the axles 52a and 53a while the outer link arms 52 contact the forward ends of the guide members 57 (FIG. 5). As a result, the vertically moving base 55 connected to the distal ends of the link arms 52 and 53 can move upwardly while moving backwardly toward the vehicle interior.

Further, the slide base 44 of the second lateral sliding mechanism 40 may be referred to as a slide portion in the present invention.

Next, the first lateral sliding mechanism 70 may preferably include a slide base or seat support base 75, a pair of slide rails 74a, guide members 74b, and a driving mechanism 76 as a drive source of the first lateral sliding mechanism 70. The slide rails 74a are attached to a lower surface of the seat support base 75 parallel with each other so as to extend along longitudinal peripheries thereof. The guide members 74b are fixedly attached to the vertically moving base 55 so as to respectively slidably receive the slide rails 74a.

Each of the slide rails 74a is an elongated bar having a rectangular shape in cross section. A pair of grooves having a V-shape in cross section are formed in opposite side surfaces of the slide rails 74a so as to longitudinally extend therealong. Each of the grooves is shaped so as to be capable of receiving a plurality of bearing balls 74c therein.

Each of the guide members 74b has a U-shape in cross section. The guide members 74b slidably engage the slide rails 74a via the bearing balls 74c that are received in the V-shaped grooves of the slide rails 74a. Thus, the seat support base 75 is capable of longitudinally sliding along the guide members 74b via the slide rails 74a.

The driving mechanism 76 may preferably includes a drive motor 71 attached to the vertically moving base 55, a rack 73 that is fixedly attached to the lower surface of the seat support base 75 parallel with the slide rails 74a, and a pinion 72 that is positioned so as to mesh with the rack 73. The pinion 72 is coupled to a drive shaft (not shown) of the drive motor 71 so as to be rotated by the drive motor 71. Therefore, when the drive motor 71 is rotated in normal and reverse directions, the seat support base 75 can move or slide along the guide members 74b.

As shown in, for example, FIG. 2, the seat main body 10 described herein includes a seat cushion 11 and a seat back 12. The seat cushion 11 is attached to the seat support base 75 of the first lateral sliding mechanism 70. Thus, the seat main body 10 is mounted on the seat support base 75 of the first lateral sliding mechanism 70. As previously described, the seat support base 75 is slidably attached to the vertically moving base 55 via the slide rails 74a and guide members 74b. Therefore, the seat main body 10 is mounted on the vertically moving base 55 via the first lateral sliding mechanism 70.

The rotation locking mechanism 80 is intended to restrain the rotation base 35 after the seat main body 10 is rotated from the forwardly facing position to the laterally facing position (FIGS. 9 and 10), i.e., after the rotation base 35 of the rotation mechanism 30 is rotated from the first rotational position to the second rotational position.

As shown in FIG. 6, the rotation locking mechanism 80 may preferably include a first engagement portion 180 attached to an upper surface of the longitudinal slide base 21 of the longitudinal sliding mechanism 20, a second engagement portion 280 disposed on a lower surface of the rotation base 35 of the rotation mechanism 30, and a lock releasing portion 380 that is attached to the slide base 44 of the second lateral sliding mechanism 40.

As shown in FIG. 6, the first engagement portion 180 is positioned to the right of the outer wheel 31b of the rotation mechanism 30. The first engagement portion 180 includes a fixture plate 182 having substantially a trapezoidal shape, and a pair of (front and rear) engagement pins 184 (one of which is shown) that are attached to the fixture plate 182.

The fixture plate 182 has a pair of elongated slots 183 that are formed along a left (long) periphery thereof so as to be juxtaposed to each other. The slots 183 are shaped so as to extend along a common circular arc. The fixture plate 182 is movably attached to the upper surface of the longitudinal slide base 21 via fixture volts 183a using the slots 183. Further, the fixture plate 182 is positioned such that a center of the common circular arc of the slots 183 is coincident with the rotation center C of the outer wheel 31b of the rotation mechanism 30. Thus, the fixture plate 182 is combined with the longitudinal slide base 21 so as to horizontally move or rotate about the rotation center C of the outer wheel 31b over a predetermined angular range.

The (front and rear) engagement pins 184 are juxtaposed to each other along a right (short) periphery of the fixture plate 182. Further, the engagement pins 184 are positioned on an additional circular arc having a center that is coincident with the rotation center C of the outer wheel 31b. However, the front engagement pin (not shown) is provided as a spare engagement pin. Therefore, only the rear engagement pin 184 is normally used.

The second engagement portion 280 is composed of a main body 281, a force transmission portion 285 and a coil spring (biasing member) 280b.

Figure 7:
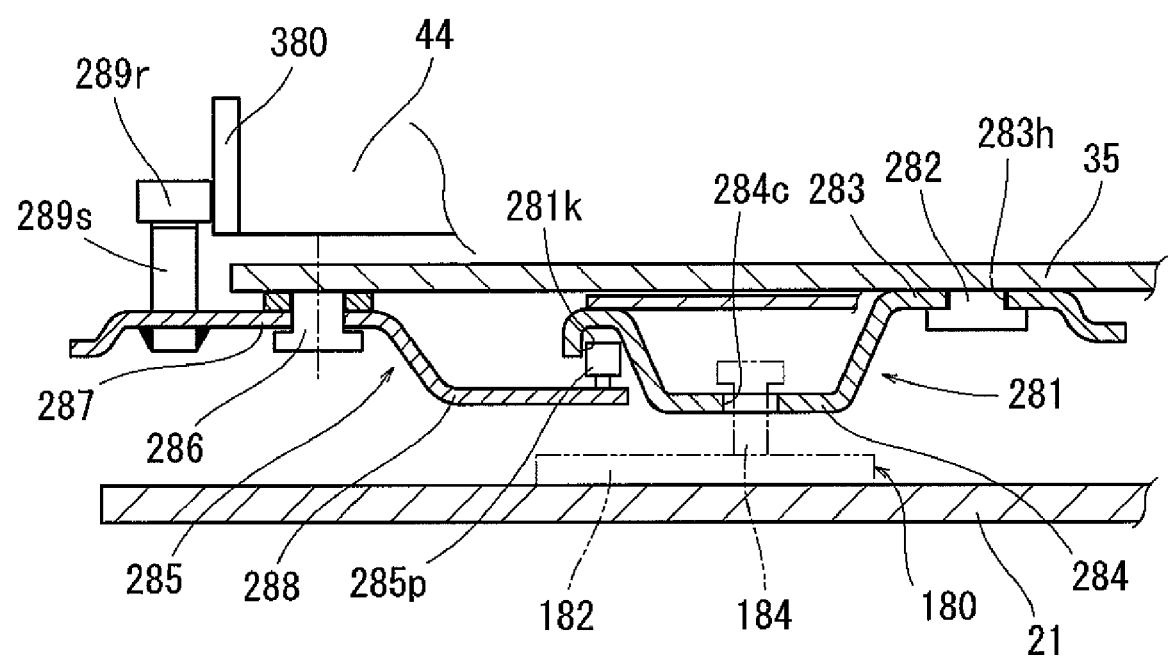
FIG. 7 is a vertical cross-sectional view of the rotation locking mechanism of the vehicle seat.
Figure 8:
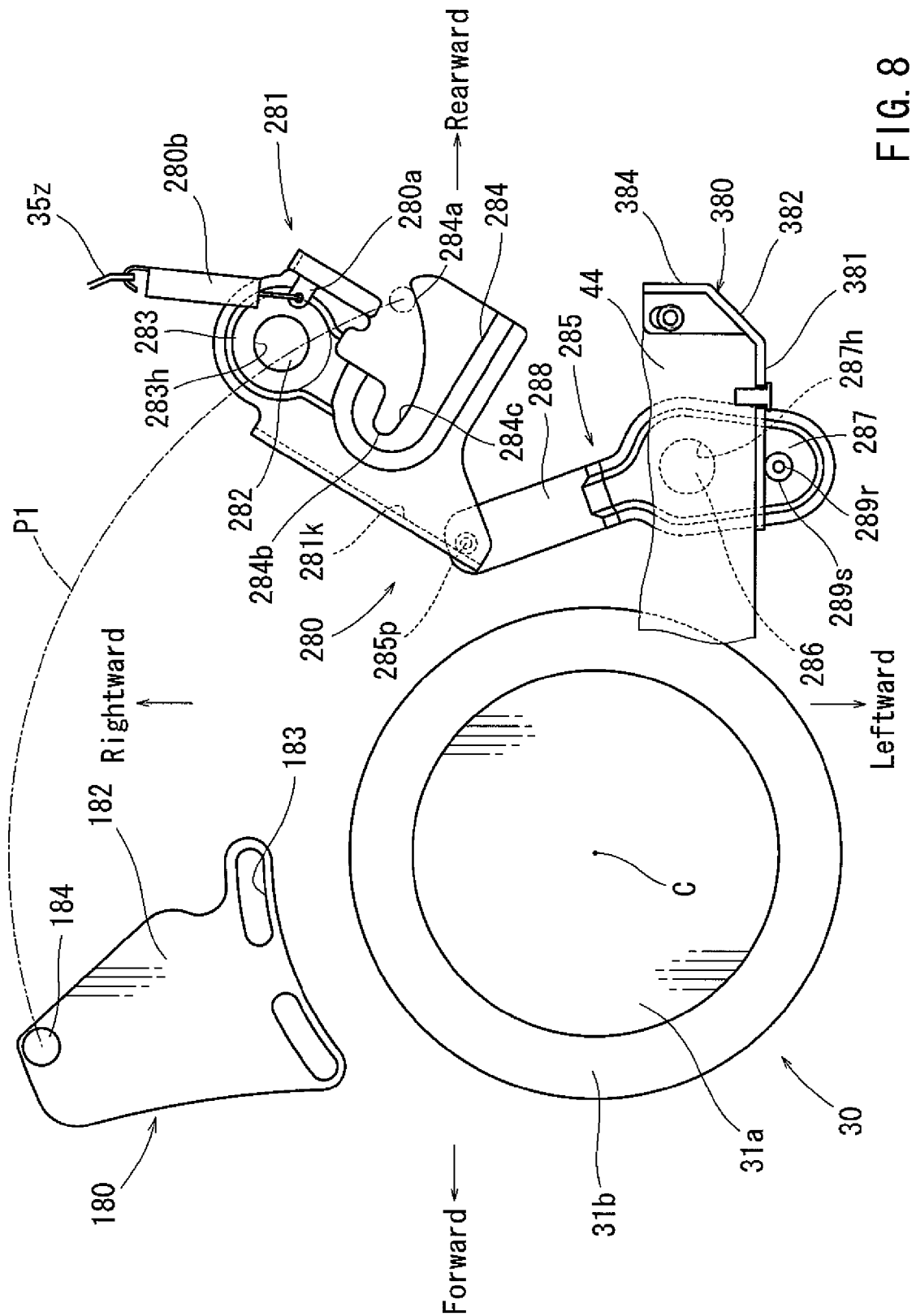
FIG. 8 is a plan view of the rotation locking mechanism of the vehicle seat, which illustrates the movement of the rotation locking mechanism.
Figure 9:
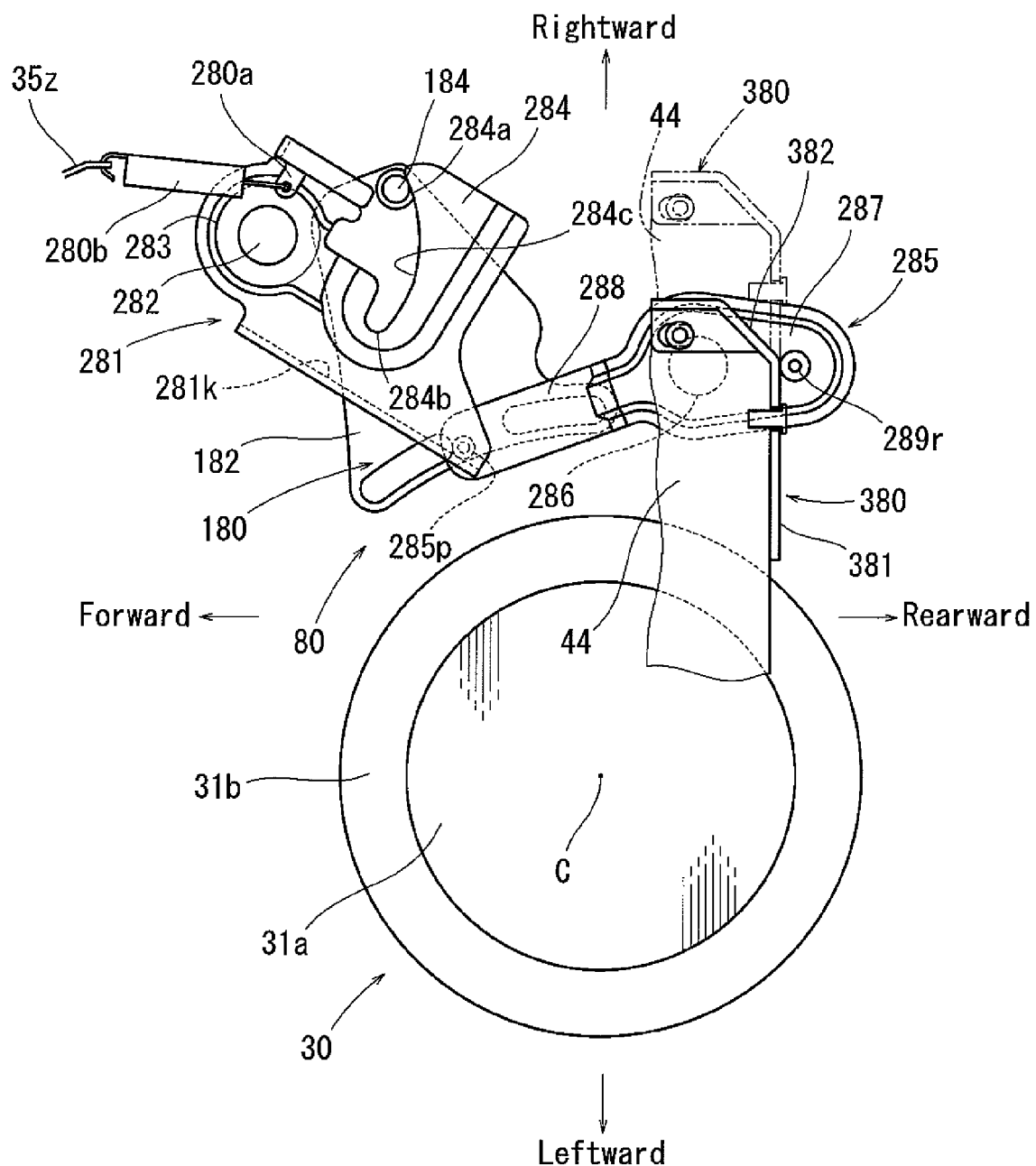
FIG. 9 is a plan view of the rotation locking mechanism of the vehicle seat, which illustrates the movement of the rotation locking mechanism.
Figure 10:
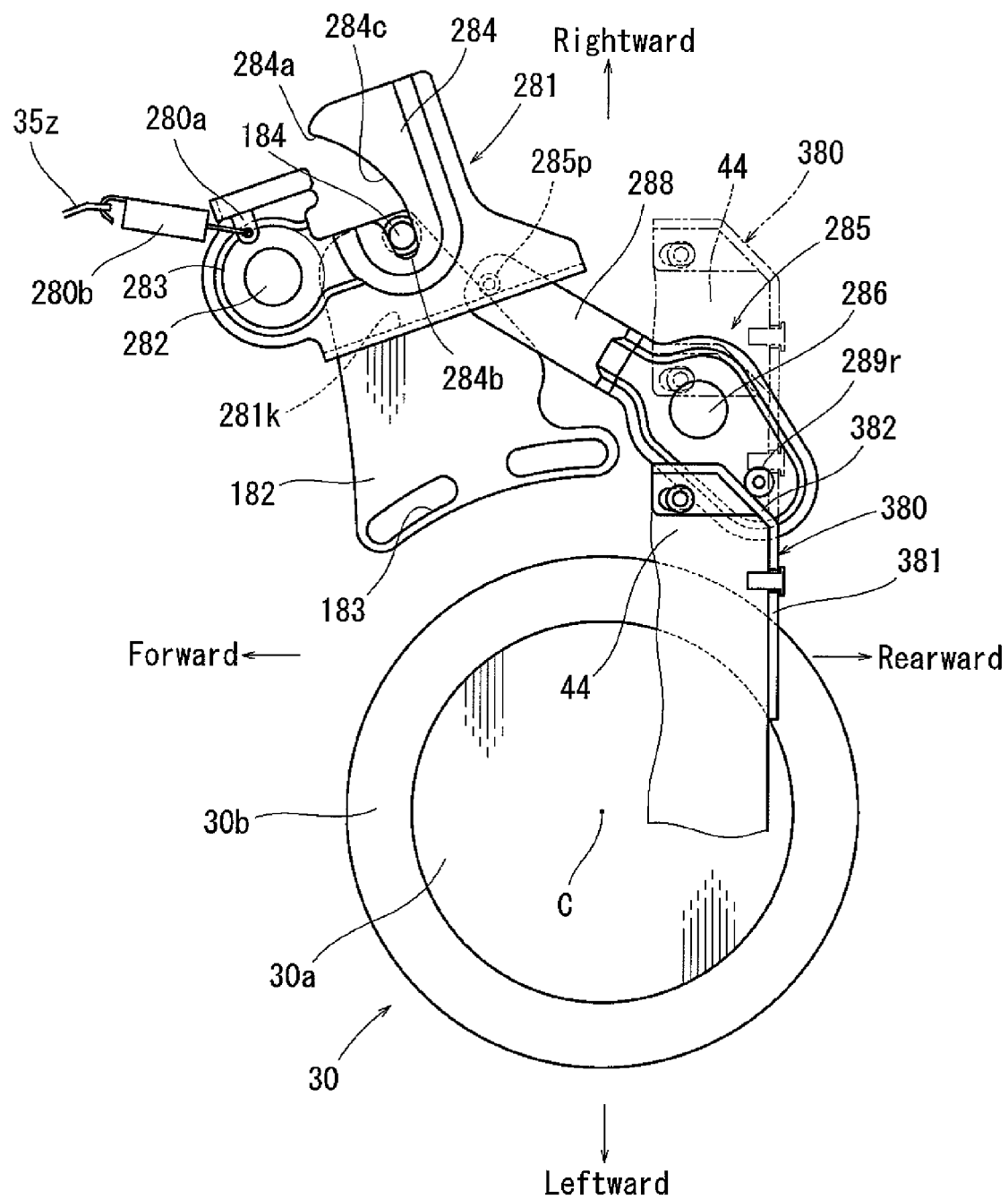
FIG. 10 is a plan view of the rotation locking mechanism of the vehicle seat, which illustrates the movement of the rotation locking mechanism.

As shown in FIGS. 6 and 7, the main body 281 is horizontally rotatably attached to the lower surface of the rotation base 35 via a connector pin 282. In particular, as shown in FIGS. 8-10, the main body 281 includes a support portion 283 having a through hole 283h formed therein. The support portion 283 is rotatably connected to the lower surface of the rotation base 35 via the connector pin 282 using through hole 283h, so that the main body 281 is horizontally rotatably attached to the lower surface of the rotation base 35.

As shown in FIGS. 8-10, the main body 281 further includes a hook portion 284 corresponding to the engagement pin 184 of the first engagement portion 180, and a linear flanged portion 281k. The hook portion 284 has an arcuate guide portion 284c. The arcuate guide portion 284c is shaped so as to extend along a circular arc having a center that is centered on the connector pin 282. Further, the guide portion 284c has an outer open end portion 284a that is radially outwardly positioned with respect to the rotation center C of the outer wheel 31b, and an inner closed recessed portion 284b that is radially inwardly positioned with respect to the rotation center C and having a width substantially identical with a diameter of the engagement pin 184.

Further, the support portion 283 is provided with a spring attachment portion 280a. The spring attachment portion 280a is positioned substantially opposite to the linear flanged portion 281k across the through hole 283h (the connector pin 282). The spring attachment portion 280a is connected to one end of the coil spring 280b. The other end of the coil spring 280b is connected to a spring attachment strip 35z that is formed in the lower surface of the rotation base 35. Thus, the main body 281 is normally biased by the coil spring 280b so as to be rotated counterclockwise in FIG. 8 about the connector pin 282. That is, the main body 281 is normally biased such that the outer open end portion 284a of the guide portion 284c may form a rotationally leading end.

As shown in FIG. 7, the main body 281 may preferably be shaped such that the support portion 283 and the connector pin 282 do not interfere with the engagement pin 184 of the first engagement portion 180 when the rotation base 35 rotates between the first rotational position and the second rotational position. As will be recognized, when the rotation base 35 rotates between the first rotational position and the second rotational position, the engagement pin 184 moves along a rotational trajectory E (FIG. 8). Further, the main body 281 may preferably be shaped such that the hook portion 284 can engage the engagement pin 184 when the rotation base 35 rotates to the second rotational position.

FIGS. 8 and 9 show a condition that the main body 281 is rotated to a clockwise limit position (which position corresponds to an unlocking position thereof) against a spring force of the coil spring 280b. The main body 281 may preferably be positioned such that the outer open end portion 284a of the guide portion 284c can engage the engagement pin 184 of the first engagement portion 180 when the main body 281 is in the unlocking position in a condition that the rotation base 35 is rotated from the first rotational position (FIG. 8) to the second rotational position (FIGS. 9 and 10) (i.e., in a condition that the seat main body 10 is rotated from the forwardly facing position to the laterally facing position). As will be appreciated, when the main body 281 is in the unlocking position, the rotation base 35 can reversely rotate from the second rotational position toward the first rotational position.

As shown in FIG. 10, when the main body 281 is rotated to a counterclockwise limit position (which position corresponds to a locking position thereof) by the spring force of the coil spring 280b in the condition that the rotation base 35 is rotated to the second rotational position, the engagement pin 184 relatively moves to the closed recessed portion 284b along the guide portion 284c. Thus, the main body 281 reliably engages or clamps the engagement pin 184, thereby preventing the rotation base 35 from reversely rotating from the second rotational position toward the first rotational position.

As shown in FIG. 6, the force transmission portion 285 is horizontally rotatably attached to the lower surface of the rotation base 35 via a connector pin 286. In particular, as shown in FIGS. 8-10, the force transmission portion 285 includes a substantially oval-shaped support portion 287 having a through hole 287h formed therein. The support portion 287 is rotatably connected to the lower surface of the rotation base 35 via the connector pin 286 using through hole 287h. Thus, the force transmission portion 285 is horizontally rotatably attached to the lower surface of the rotation base 35.

As shown in FIGS. 8-10, the force transmission portion 285 further includes a lever portion 288 extended from the support portion 287, and a force transmission pin 285p that is attached to an upper surface of the lever portion 288. The force transmission pin 285p is positioned at a distal end of the lever portion 288. As best shown in FIG. 7, the force transmission pin 285p is arranged and constructed to contact an inner surface of the linear flanged portion 281k of the main body 281 so as to rotate the main body 281 clockwise when the force transmission portion 285 is rotated counterclockwise.

The support portion 287 of the force transmission portion 285 is provided with a roller 289r via a roller support pin 289s that is positioned substantially opposite to the force transmission pin 285p across the through hole 287h (the connector pin 286). Further, as shown in FIG. 7, the roller support pin 289s is leftwardly spaced away from a periphery of the rotation base 35 so as to not interfere therewith.

As shown in FIGS. 6 and 8, the lock releasing portion 380 is fixedly attached to a left rear end portion of the slide base 44 of the second lateral sliding mechanism 40. As best shown in FIG. 8, the lock releasing portion 380 may preferably include a continuous vertical wall that is composed of a left wall portion 381, a transition wall portion 382 bent counterclockwise at 45 degrees to the left wall portion 381, and a rear wall portion 384 bent counterclockwise at 45 degrees to the transition wall portion 382. As shown in FIG. 8, the lock releasing portion 380 is positioned such that the roller 289r of the support portion 287 contacts the left wall portion 381 thereof when the slide base 44 is positioned in substantially the rearmost position thereof (FIGS. 3 and 4).

As shown by broken lines in FIGS. 8 and 9, when the slide base 44 is positioned in the rear-most position thereof, the roller 289r of the force transmission portion 285 contacts the left wall portion 381 of the lock releasing portion 380. Therefore, the force transmission portion 285 unrotatably engages the lock releasing portion 380 via the roller 289r while the force transmission pin 285p contacts one end portion of the linear flanged portion 281k of the main body 281. As a result, the main body 281 is biased clockwise about the connector pin 282 against the spring force of the coil spring 280b, so as to be maintained at the unlocking position.

As shown by solid lines in FIG. 9, when the slide base 44 moves forwardly (downwardly in FIG. 9) along the guide rails 41, the roller 289r of the force transmission portion 285 relatively moves along the left wall portion 381 of the lock releasing portion 380 because the lock releasing portion 380 moves forwardly with the slide base 44. As shown by solid lines in FIG. 10, when the roller 289r reaches the transition wall portion 382 of the lock releasing portion 380, the force transmission portion 285 is released from the lock releasing portion 380 so as to be rotatable about the connector pin 286. As a result, the main body 281 can be rotated counterclockwise about the connector pin 282 by the spring force of the coil spring 280b while moving the force transmission pin 285p along the linear flanged portion 281k of the main body 281 toward the other end portion thereof. Upon completion of the counterclockwise rotation, the main body 281 can be changed to the locking position thereof.

Next, an operation of the vehicle seat S thus constructed will be described.

When the seat main body 10 is in the forwardly facing position in the vehicle interior, the drive motor 24a of the driving mechanism 24 is driven, so that the longitudinal slide base 21 is positioned at a normal base position on the slide rails 22. Thus, the seat main body 10 is positioned at a normal seat position on the vehicle floor F (e.g., a position F1 shown by solid lines in FIG. 1).

At this time, the drive motor 32m of the driving mechanism 32 (the rotation mechanism 30) is driven normally such that the outer wheel 31b is rotated to the first rotational position (FIGS. 8 and 11). Further, the first gear 32x of the gear transmission mechanism 32a engages the specially shaped portion 32ya of the second gear 32y, so that the second gear 32y is in the inclined position (shown by broken lines in FIG. 11). Therefore, the outer wheel 31b (the rotation base 35) is rotationally locked at this position. Thus, the seat main body 10 is rotationally locked at the forwardly facing position.

Also, at this time, the drive motor 45a of the driving mechanism 45 (the second lateral sliding mechanism 40) is driven such that the slide base 44 is shifted to the rear-most position (FIGS. 3 and 8). Therefore, as shown in FIG. 8, the main body 281 of the second engagement portion 280 is maintained at the unlocking position, so that the rotation locking mechanism 80 is maintained in an unlocking condition. That is, the roller 289r of the force transmission portion 285 contacts the left wall portion 381 of the lock releasing portion 380, so that the force transmission portion 285 unrotatably engages the lock releasing portion 380 while the force transmission pin 285p contacts one end portion of the linear flanged portion 281k of the main body 281. Thus, the main body 281 is rotationally biased clockwise about the connector pin 282 against the spring force of the coil spring 280b, so as to be maintained at the unlocking position.

Next, in order to move the seat main body 10 from the forwardly facing position in the vehicle interior to the lower position in the vehicle exterior, the drive motor 24a of the driving mechanism 24 (the longitudinal sliding mechanism 20) is first driven, so that the longitudinal slide base 21 is moved to a base rotating position on the slide rails 22. At this time, the seat main body 10 is positioned at a seat rotation position on the vehicle floor F (i.e., a position F2 shown by broken lines in FIG. 1). Thereafter, the drive motor 32m of the driving mechanism 32 (the driving mechanism 30) is driven reversely. Upon actuation of the drive motor 32m, the first gear 32x of the gear transmission mechanism 32a is disengaged from the specially shaped portion 32ya of the second gear 32y, so that the second gear 32y is moved from the inclined position (shown by broken lines in FIG. 11) to the normal position (shown by solid lines in FIG. 11). Thus, the outer wheel 31b (the rotation base 35) is unlocked. As a result, the seat main body 10 is unlocked at the forwardly facing position.

When the drive motor 32m of the driving mechanism 32 is further driven reversely, the outer wheel 31b can be horizontally leftwardly rotated (i.e., counterclockwise in FIG. 11) via the transmission mechanism 32a. The drive motor 32m is continuously driven until the outer wheel 31b is rotated about 90 degrees. Thus, the outer wheel 31b (the rotation base 35) is rotated from the first rotational position to the second rotational position. As a result, the seat main body 10 is rotated to the laterally facing position (FIG. 3).

As shown in FIG. 9, when the rotation base 35 reaches the second rotational position, the force transmission portion 285 still unrotatably engages the lock releasing portion 380 via the roller 289r while the force transmission pin 285p contacts one end portion of the linear flanged portion 281k of the main body 281, so that the main body 281 is still maintained at the unlocking position. However, at this time, the outer open end portion 284a of the guide portion 284c of the main body 281 may preferably contact the engagement pin 184 of the first engagement portion 180.

Further, the drive motor 71 of the first lateral sliding mechanism 70 is rotated in a normal direction before the rotational motion of the rotation base 35 (the seat main body 10) is completed, so as to move or advance the seat support base 75 from the vehicle interior toward the vehicle exterior (i.e., from a rear-most position toward a forward-most position) along the guide members 74b on the vertically moving base 55 of the vertically moving mechanism 50. Thus, as shown in FIG. 4, the seat main body 10 attached to the seat support base 75 can be moved or advanced from the vehicle exterior toward the vehicle exterior.

Moreover, the drive motor 45a of the second lateral sliding mechanism 40 is rotated in a normal direction before the advancing motion of the seat support base 75 (the seat main body 10) is completed, so as to move or advance the slide base 44 along the guide rails 41. As a result, as shown in FIG. 5, the vertically moving base 55 is advanced while it is downwardly moved via the four-bar linkage mechanisms 51. Thus, the seat main body 10 attached to the vertically moving base 55 via the seat support base 75 can be further moved or advanced while it is downwardly moved toward the lower position.

As shown in FIG. 9, when the slide base 44 is advanced along the guide rails 41, the roller 289r of the force transmission portion 285 of the rotation locking mechanism 80 relatively moves along the left wall portion 381 of the lock releasing portion 380. At this time, the force transmission portion 285 still unrotatably engages the lock releasing portion 380 via the roller 289r while the force transmission pin 285p contacts the linear flanged portion 281k of the main body 281. That is, the main body 281 is still maintained at the unlocking position at the start of the advancing motion of the slide base 44.

As shown in FIG. 10, when the roller 289r reaches the transition wall portion 382 of the lock releasing portion 380, the force transmission portion 285 is released from the lock releasing portion 380 so as to be rotatable about the connector pin 286. As a result, the main body 281 is rotated counterclockwise about the connector pin 282 by the spring force of the coil spring 280b while moving the force transmission pin 285p along the linear flanged portion 281k of the main body 281 toward the other end portion thereof (i.e., while rotating the force transmission portion 285 clockwise about the connector pin 286). Upon completion of the counterclockwise rotation, the main body 281 is changed to the locking position thereof.

As shown in FIG. 10, when the main body 281 is rotated counterclockwise toward the locking position by the spring force of the coil spring 280b, the engagement pin 184 relatively moves along the guide portion 284c. When the main body 281 reaches the locking position thereof, the engagement pin 184 engages the closed recessed portion 284b of the guide portion 284c. As a result, the main body 281 reliably engages or clamps the engagement pin 184, so as to be maintained in the locking position thereof. That is, the rotation locking mechanism 80 can be maintained in a locking condition. Thus, the rotation base 35 of the rotation mechanism 30 can be effectively prevented from rotating. That is, the rotation base 35 can be effectively rotationally locked via the rotation locking mechanism 80.

Generally, when the main body 281 engages the engagement pin 184 (i.e., when the rotation locking mechanism 80 is changed to the locking condition), the second lateral sliding mechanism 40 is deactuated, so as to stop the sliding motion of the slide base 44. When the seat support base 75 of the first lateral sliding mechanism 70 is completely moved to the vehicle exterior (i.e., when the seat main body 10 is completely moved to the vehicle exterior), the second lateral sliding mechanism 40 is actuated again, so that the slide base 44 is advanced along the guide rails 41 until the seat main body 10 reaches the lower position thereof.

As will be recognized, when the slide base 44 is advanced over a desired distance, the roller 289r of the force transmission portion 285 is disengaged from the lock releasing portion 380. However, the rotation locking mechanism 80 can be reliably maintained in the locking condition, because the main body 281 is normally biased counterclockwise by the spring force of the coil spring 280b. Thus, the seat main body 10 can be moved from the laterally facing position in the vehicle interior to the lower position in the vehicle exterior while the rotation base 35 is reliably prevented from rotating.

Further, in this embodiment, as described above, the slide base 44 of the second lateral sliding mechanism 40 is moved along the guide rails 41 before the advancing motion of the seat support base 75 (the seat main body 10) is completed. However, the slide base 44 of the second lateral sliding mechanism 40 can be moved along the guide rails 41 after the advancing motion of the seat support base 75 (the seat main body 10) is completed.

To the contrary, in order to return the seat main body 10 from the lower position in the vehicle exterior to the forwardly facing position in the vehicle interior, a reverse operation to the operation described above is performed. That is, the drive motor 45a of the second lateral sliding mechanism 40 is first rotated in a reverse direction, so as to move or retract the slide base 44 along the guide rails 41. As a result, the vertically moving base 55 of the vertically moving mechanism 50 is moved or retracted toward the vehicle interior while it is upwardly moved via the four-bar linkage mechanisms 51. Thus, the seat main body 10 attached to the vertically moving base 55 via the seat support base 75 can be moved or retracted while it is upwardly moved.

On the other hand, the drive motor 71 of the first lateral sliding mechanism 70 is rotated in a reverse direction before the retracting motion of the slide base 44 is completed, so as to move or retract the seat support base 75 from the vehicle exterior toward the vehicle interior (i.e., from the forward-most position toward the rear-most position) along the guide members 74b on the vertically moving base 55. Thus, the seat main body 10 attached to the seat support base 75 can be further moved or retracted toward the vehicle interior.

As will be appreciated, the retracting motion of the slide base 44 and the seat support base 75 can be performed while the rotation base 35 is reliably prevented from rotating, because the main body 281 of the rotation locking mechanism 80 is still maintained in the locking position. Thus, the seat main body 10 can be moved from the lower position in the vehicle exterior to the laterally facing position in the vehicle interior while the rotation base 35 is reliably prevented from rotating.

When the slide base 44 is further retracted along the guide rails 41 until the lock releasing portion 380 (the transition wall portion 382) attached thereto contacts the roller 289r of the force transmission portion 285 of the rotation locking mechanism 80, the roller 289r is pushed rearwardly (FIG. 10). As a result, the force transmission portion 285 is rotated counterclockwise about the connector pin 286. Upon counterclockwise rotation of the force transmission portion 285, the main body 281 is rotated clockwise toward the unlocking position against the spring force of the coil spring 280b while the force transmission pin 285p of the force transmission portion 285 moves along the linear flanged portion 281k of the main body 281 toward one end portion thereof. At this time, the engagement pin 184 relatively moves toward the outer open end portion 284a along the guide portion 284c. Upon completion of clockwise rotation of the main body 281 (i.e., upon completion of counterclockwise rotation of the force transmission portion 285), the engagement pin 184 reaches the outer open end portion 284a (FIG. 9). At this time, the roller 289r moves onto the left wall portion 381 of the lock releasing portion 380, so that the force transmission portion 285 unrotatably engages the lock releasing portion 380 via the roller 289r. As a result, the main body 281 is changed to the unlocking position thereof. That is, the rotation locking mechanism 80 is changed to the unlocking condition.

After the rotation locking mechanism 80 is changed to the unlocking condition, the drive motor 32m of the driving mechanism 32 (the driving mechanism 30) is driven normally while the drive motors 45a and 71 are driven so as to further retract the slide base 44 and the seat support base 75. Upon actuation of the drive motor 32m, the outer wheel 31b can be horizontally rightwardly rotated (i.e., clockwise in FIG. 11) via the transmission mechanism 32a. The drive motor 32m is continuously driven until the outer wheel 31b is rotated about 90 degree. Thus, the outer wheel 31b (the rotation base 35) is rotated from the second rotational position to the first rotational position. As a result, the seat main body 10 is rotated from the laterally facing position to the forwardly facing position in the vehicle interior. Thus, the seat main body 10 is positioned at the seat rotation position on the vehicle floor F (i.e., the position F2 shown by broken lines in FIG. 1).

Thereafter, the drive motor 32m is further driven until the first gear 32x of the gear transmission mechanism 32a engages the specially shaped portion 32ya of the second gear 32y, so that the second gear 32y is moved from the normal position (shown by solid lines in FIG. 11) to the inclined position (shown by broken lines in FIG. 11). Thus, the outer wheel 31b (the rotation base 35) is rotationally locked. As a result, the seat main body 10 is unrotatably locked at the forwardly facing position. At this time, the seat main body 10 is still positioned at the seat rotation position on the vehicle floor F (the position F2 shown by broken lines in FIG. 1). That is, the longitudinal slide base 21 is positioned at the base rotating position on the slide rails 22.

Subsequently, the drive motor 24a of the driving mechanism 24 (the longitudinal sliding mechanism 20) is driven, so that the longitudinal slide base 21 is moved to the normal base position on the slide rails 22. As a result, the seat main body 10 is moved to the normal seat position on the vehicle floor F (the position F1 shown by solid lines in FIG. 1) while it is unrotatably locked at the forwardly facing position. Thus, the seat main body 10 is returned from the vehicle exterior to the vehicle interior.

According to the vehicle seat S thus constructed, even if a large external force is laterally applied to the seat main body 10 when the seat main body 10 is moved between the laterally facing position in the vehicle interior to the lower position in the vehicle exterior (i.e., when the slide base 44 of the second lateral sliding mechanism 40 is moved along the guide rails 41), such an external force can be effectively received or absorbed by the rotation locking mechanism 80 because the rotation base 35 of the rotation mechanism 30 is effectively locked via the rotation locking mechanism 80. In other words, the external force applied to the seat main body 10 can be effectively prevented from being transmitted to the driving mechanism 32 (the drive motor 32m) of the of the rotation mechanism 30. As a result, the driving mechanism 32 can be effectively prevented from being damaged by the external force.

Further, the lock releasing portion 380 of the rotation locking mechanism 80 is attached to the slide base 44 of the second lateral sliding mechanism 40. Therefore, the rotation locking mechanism 80 can be automatically switched between the locking condition and the unlocking condition depending upon the sliding motion of the slide base 44 of the second lateral sliding mechanism 40. Therefore, an additional actuator is not required in order to move the rotation locking mechanism 80.

Further, the rotation locking mechanism 80 can be maintained in the locking condition by the coil spring 280b. Therefore, the rotation locking mechanism 80 can be structurally simplified.

Further, the second engagement portion 280 of the rotation locking mechanism 80 is composed of the main body 281 and the force transmission portion 285 that are separated from each other. Therefore, the rotation locking mechanism 80 may have an increased degree of freedom of arrangement.

Second Detailed Representative Embodiment

The second detailed representative embodiment will now be described with reference to FIGS. 12 to 14. Because the second embodiment relates to the first embodiment, only constructions, elements and operations that are different from the first embodiment will be explained in detail. Elements that are the same in the first and second embodiments will be identified by the same reference numerals and a detailed description of such elements will be omitted.

This embodiment is different from the first embodiment in that the vehicle seat S includes a rotation locking mechanism 400 that is structurally different from the rotation locking mechanism 80 of the first embodiment.

Figure 12:
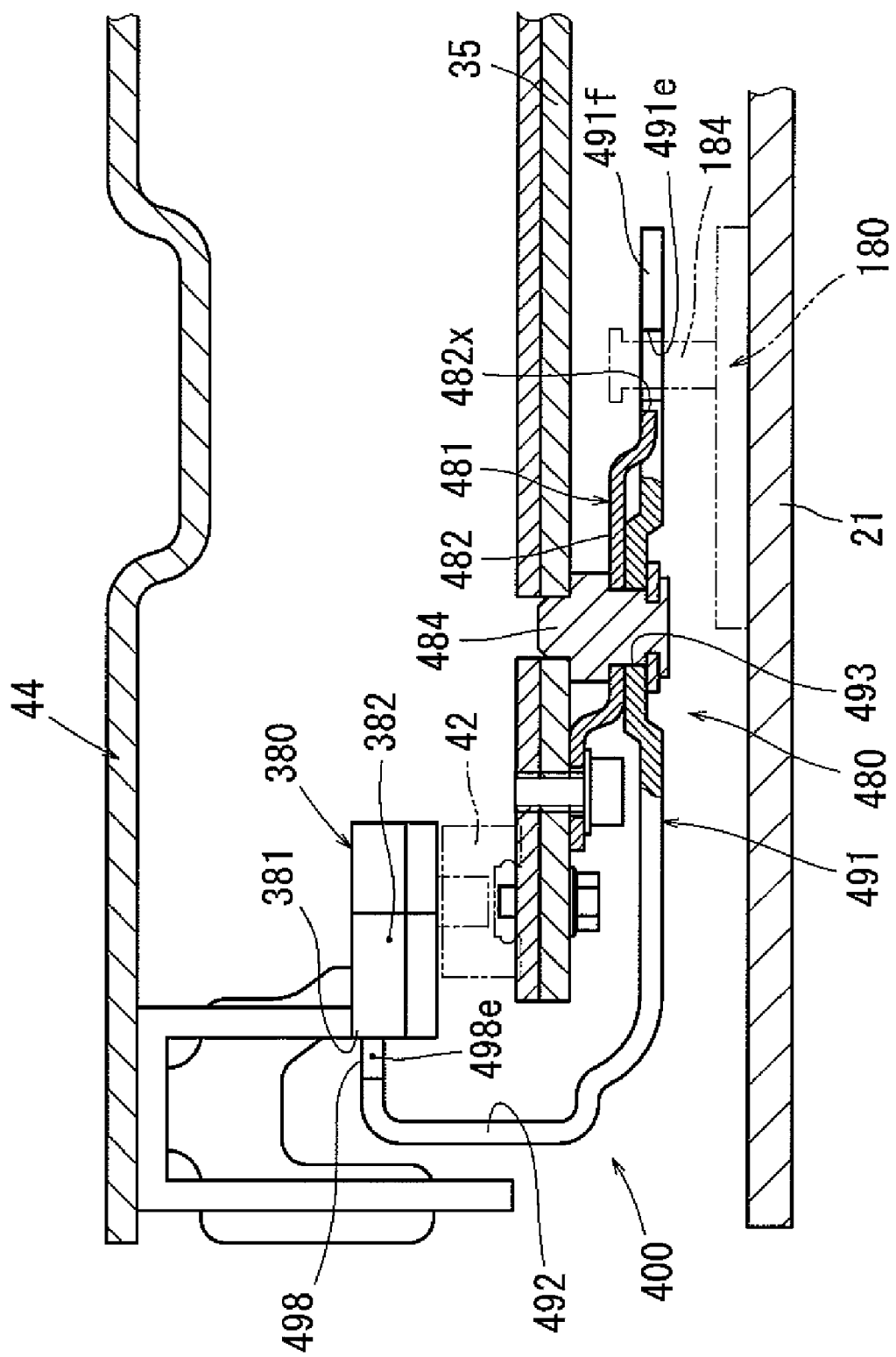
FIG. 12 is a vertical cross-sectional view of a rotation locking mechanism of a vehicle seat according to a second embodiment of the present invention, which view corresponds to FIG. 7.
Figure 13:
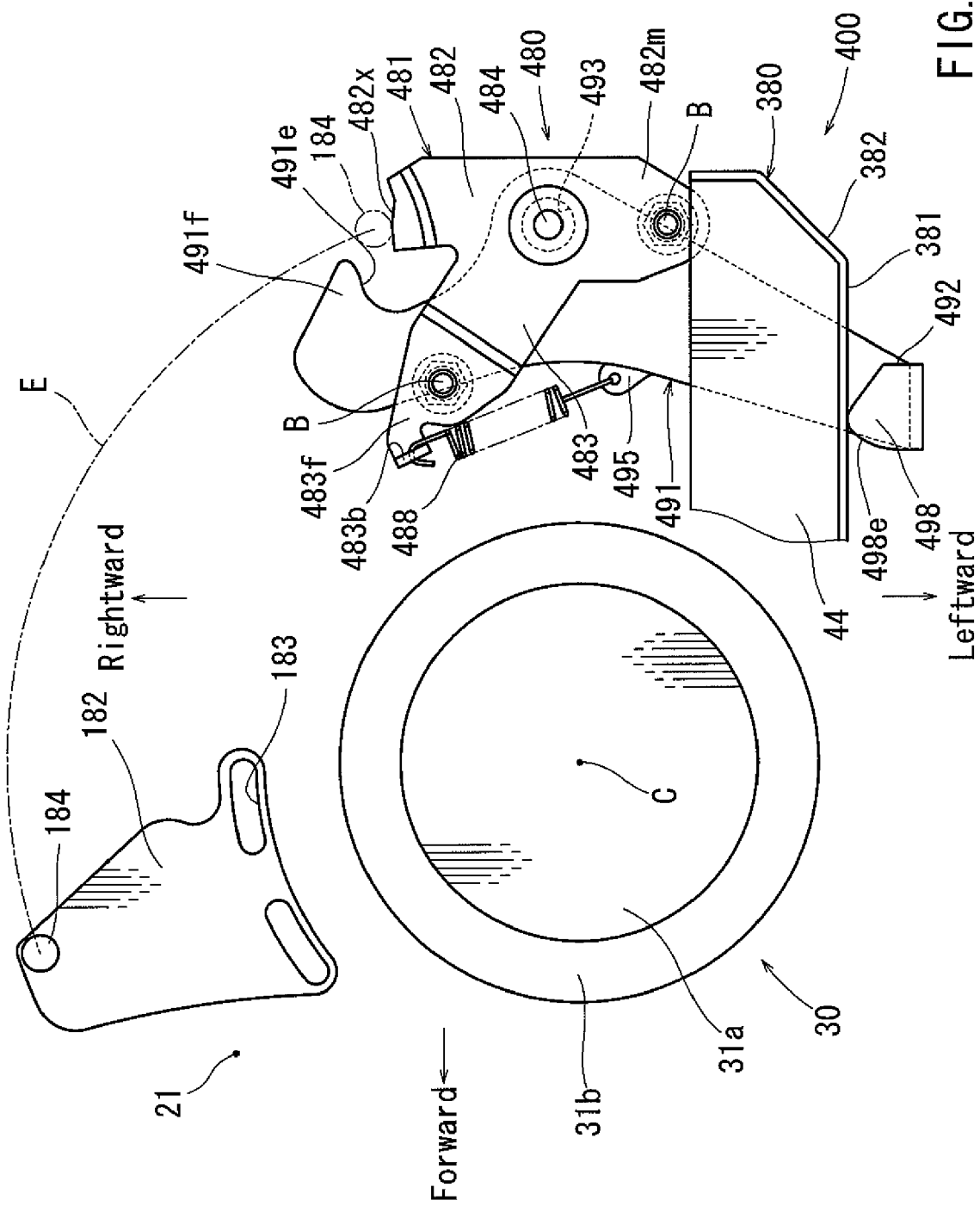
FIG. 13 is a plan view of the rotation locking mechanism of the vehicle seat, which illustrates movement of the rotation locking mechanism.

As shown in FIGS. 12 and 13, the rotation locking mechanism 400 may preferably include a second engagement portion 480 in place of the second engagement portion 280 of the first embodiment. Similar to the second engagement portion 280, the second engagement portion 480 is disposed on the lower surface of the rotation base 35 of the rotation mechanism 30.

The second engagement portion 480 is composed of a plate-shaped main body (stationary member) 481, a one-piece elongated plate-shaped movable member 491 and a coil spring (biasing member) 488.

As shown in FIG. 13, the stationary member 481 is integrally formed in substantially a T-shape, and having a contacting portion 482 and a spring retainer portion 483 that is obliquely extended from a central portion of the contacting portion 482. The stationary member 481 is fixedly or immovably attached to the lower surface of the rotation base 35 via a pair of connector pins B such that the contacting portion 482 is substantially positioned on an extended line of the rotational trajectory E of the engagement pin 184 and that the spring retainer portion 483 is directed toward the outer wheel 31b of the rotation mechanism 30. As will be apparent from FIG. 13, the connector pins B are respectively positioned at a rear end portion 482m of the contacting portion 482 and a distal end portion 483f of the spring retainer portion 483. Further, as shown in FIG. 12, the central portion of the contacting portion 482 (i.e., a proximal end portion of the spring retainer portion 483) is connected to the lower surface of the rotation base 35 via a connector pin 484.

As shown in FIG. 13, the contacting portion 482 includes a concave contacting surface 482x that is formed in a forward end portion thereof. The contacting surface 482x may preferably be shaped so as to engage the engagement pin 184 when the rotation base 35 rotates to the second rotational position. Further, the distal end portion 483f of the spring retainer portion 483 is provided with a spring attachment portion 483b. The spring attachment portion 483b is connected to one end of the coil spring 488.

As shown in FIG. 13, the movable member 491 is provided with a hook portion 491f and a contact portion 492 that are respectively formed in longitudinal opposite (forward and rearward) end portions thereof. The movable member 491 is horizontally rotatably attached to the lower surface of the rotation base 35 via the connector pin 484 with intervening the stationary member 481 therebetween. In particular, as shown in FIGS. 13 and 14, the movable member 491 is rotatably connected to the lower surface of the rotation base 35 via the connector pin 484 using a through hole 493 that is formed in substantially a central portion thereof. Thus, the movable member 491 is horizontally rotatably attached to the lower surface of the rotation base 35, so as to rotate between a counterclockwise limit position shown in FIG. 13 (which position corresponds to an unlocking position thereof) and a clockwise limit position shown in FIG. 14 (which position corresponds to a locking position thereof).

Figure 14:
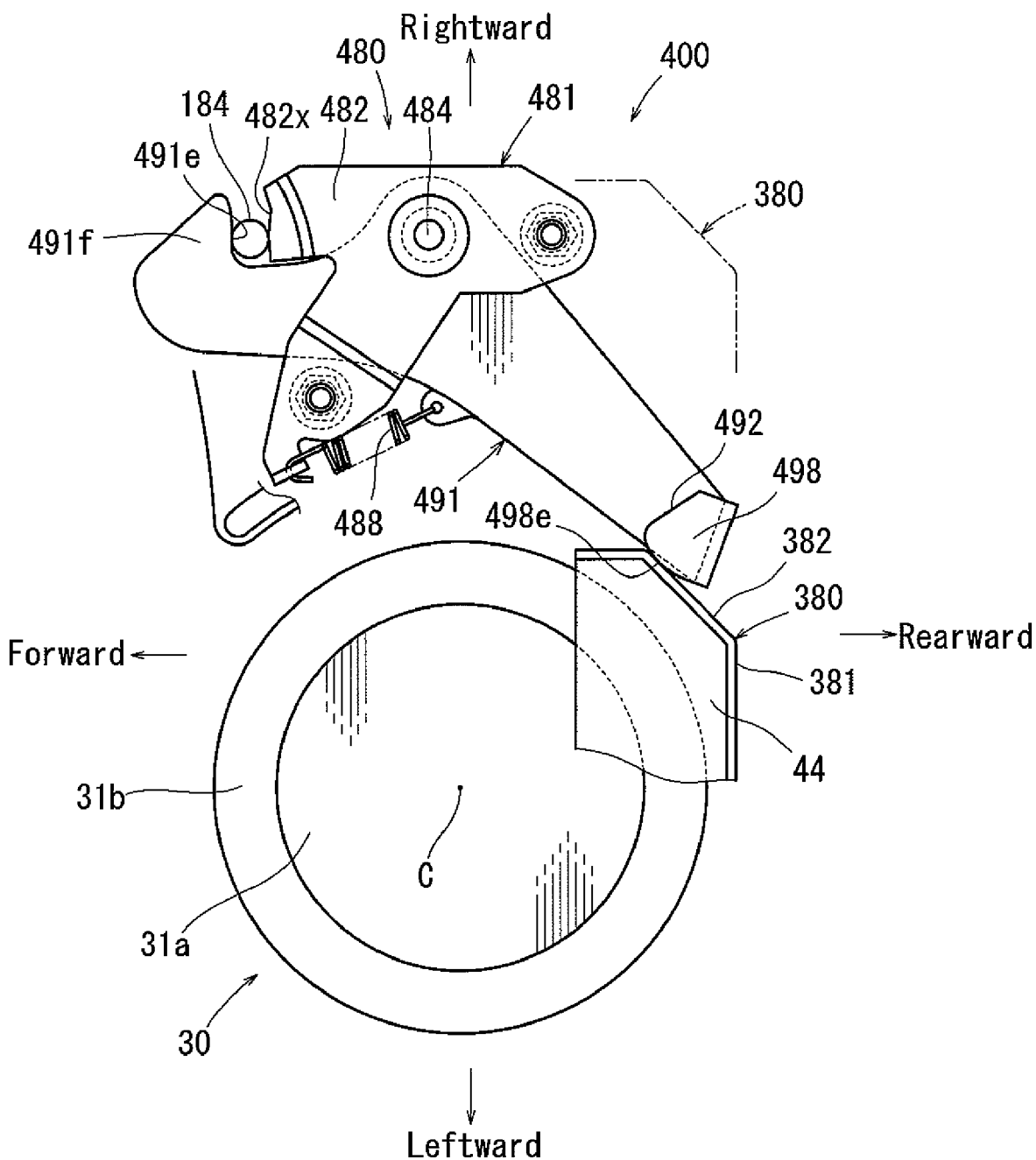
FIG. 14 is a plan view of the rotation locking mechanism of the vehicle seat, which illustrates the movement of the rotation locking mechanism.

As shown in FIGS. 13 and 14, the movable member 491 is substantially elongated along the extended line of the rotational trajectory E of the engagement pin 184. In addition, the hook portion 491f of the movable member 491 has an engagement surface 491e. The hook portion 491f is shaped such that the engagement surface 491e engages the engagement pin 184 when the movable member 491 is in the locking position thereof (FIG. 14) in the condition that the rotation base 35 rotates to the second rotational position. Therefore, the engagement pin 184 can be clamped between the engagement surface 491e of the movable member 491 and the contacting surface 482x of the contacting portion 482 (the stationary member 481) when the movable member 491 rotates to the locking position thereof in the condition that the rotation base 35 rotates to the second rotational position. As will be recognized, when the engagement pin 184 is clamped between the movable member 491 and the stationary member 481, the rotation base 35 can be prevented from reversely rotating from the second rotational position toward the first rotational position.

As shown in FIGS. 13 and 14, the movable member 491 is provided with a spring attachment portion 495 that is projected toward the outer wheel 31b of the rotation mechanism 30. The spring attachment portion 495 thus formed is connected to the other end of the coil spring 488, so that the movable member 491 is normally biased by the coil spring 488 so as to be rotated clockwise in FIGS. 13 and 14 about the connector pin 484.

As best shown in FIG. 12, the contact portion 492 of the movable member 491 is formed by upwardly bending or folding the rearward end portion of the movable member 491. The contact portion 492 extends beyond the rotation base 35 of the rotation mechanism 30 and having a folded back portion 498. Also, as shown in FIGS. 13 and 14, the folded back portion 498 has a rounded contact edge 498e that is capable of contacting the left wall portion 381 and the transition wall portion 382 of the lock releasing portion 380.

As shown in FIG. 13, when the slide base 44 is positioned in substantially the rear-most position thereof, the contact edge 498e of the folded back portion 498 (the contact portion 492) contacts the left wall portion 381 of the lock releasing portion 380. Therefore, the movable member 491 unrotatably engages the lock releasing portion 380 via the folded back portion 498. As a result, the movable member 491 is biased counterclockwise about the connector pin 484 against a spring force of the coil spring 488, so as to be maintained at the unlocking position thereof.

When the slide base 44 moves forwardly (downwardly in FIG. 14) along the guide rails 41, the contact edge 498e of the folded back portion 498 relatively moves along the left wall portion 381 of the lock releasing portion 380 because the lock releasing portion 380 moves forwardly with the slide base 44. As shown by solid lines in FIG. 14, when the folded back portion 498 reaches the transition wall portion 382 of the lock releasing portion 380, the movable member 491 is released from the lock releasing portion 380. As a result, the movable member 491 can be rotated clockwise about the connector pin 484 by the spring force of the coil spring 488, so that the engagement pin 184 can be clamped between the engagement surface 491e thereof and the contacting surface 482x of the contacting portion 482. Upon completion of the clockwise rotation, the movable member 491 is changed to the locking position thereof and is maintained at the position by the spring force of the coil spring 488.

Next, an operation of the vehicle seat S in this embodiment will be described.

Similar to the first embodiment, when the seat main body 10 is in the forwardly facing position (when the rotation base 35 is in the first rotational position), the movable member 491 of the rotation locking mechanism 400 is maintained at the unlocking position (FIG. 13). That is, the contact edge 498e of the folded back portion 498 contacts the left wall portion 381 of the lock releasing portion 380, so that the movable member 491 unrotatably engages the lock releasing portion 380. Thus, the movable member 491 is biased counterclockwise about the connector pin 484 against the spring force of the coil spring 488, so as to be maintained at the unlocking position. That is, the rotation locking mechanism 400 is in an unlocking condition.

When the seat main body 10 is rotated to the laterally facing position (when the rotation base 35 reaches the second rotational position), the movable member 491 still unrotatably engages the lock releasing portion 380 via the folded back portion 498, so as to be still maintained at the unlocking position. However, at this time, the contacting surface 482x of the contacting portion 482 (the stationary member 481) may preferably contact the engagement pin 184 of the first engagement portion 180.

When the slide base 44 is moved or advanced from the rear-most position thereof along the guide rails 41 in order to move the seat main body 10 to the vehicle exterior, the contact edge 498e of the folded back portion 498 relatively moves along the left wall portion 381 of the lock releasing portion 380. At this time, the movable member 491 still unrotatably engages the lock releasing portion 380 via the folded back portion 498. That is, the movable member 491 is still maintained at the unlocking position thereof at the start of the advancing motion of the slide base 44.

As shown by solid lines in FIG. 14, when the folded back portion 498 reaches the transition wall portion 382 of the lock releasing portion 380, the movable member 491 is released from the lock releasing portion 380 so as to be rotatable about the connector pin 484. As a result, the movable member 491 is rotated clockwise about the connector pin 484 by the spring force of the coil spring 488 while the folded back portion 498 moves along the transition wall portion 382, so that the engagement pin 184 is clamped between the engagement surface 491e of the movable member 491 and the contacting surface 482x of the contacting portion 482. Thus, the movable member 491 is changed to the locking position thereof, so that the rotation locking mechanism 400 can be maintained in a locking condition. As a result, the rotation base 35 of the rotation mechanism 30 can be effectively prevented from rotating.

To the contrary, when the slide base 44 is moved or retracted toward the rear-most position thereof along the guide rails 41 in order to return the seat main body 10 from the vehicle exterior to the vehicle interior, the folded back portion 498 of the movable member 491 is pushed rearwardly by the lock releasing portion 380 (the transition wall portion 382) (FIG. 14). As a result, the movable member 491 is rotated counterclockwise about the connector pin 484 against the spring force of the coil spring 488 while the folded back portion 498 moves along the transition wall portion 382, so that the engagement pin 184 is unclamped. Upon completion of the counterclockwise rotation of the movable member 491, the folded back portion 498 thereof moves onto the left wall portion 381 of the lock releasing portion 380, so that the movable member 491 unrotatably engages the lock releasing portion 380. Thus, the movable member 491 is changed to the unlocking position thereof, so that the rotation locking mechanism 400 is returned to the unlocking condition. As a result, the rotation base 35 of the rotation mechanism 30 can be rotated and as a result, the seat main body 10 can be rotated from the laterally facing position to the forwardly facing position.

According to the second embodiment, the rotation locking mechanism 400 is designed such that only the movable member 491 of the second engagement portion 480 can be rotated. Therefore, the rotation locking mechanism 400 can be structurally simplified.

Further, in the first embodiment, the second engagement portion 280 is composed of two members (i.e., the main body 281 and the force transmission portion 285) that are movable relative to each other. However, the second engagement portion 280 can be formed as a one-piece member.

Moreover, in the second embodiment, the engagement pin 184 is clamped between the engagement surface 491e of the movable member 491 and the contacting surface 482x of the contacting portion 482 when the rotation locking mechanism 400 is in the locking condition. That is, the engagement surface 491e and the contacting surface 482x contact the engagement pin 184. However, the engagement surface 491e and the contacting surface 482x can be spaced away from the engagement pin 184.

Moreover, in the first and second embodiments, the rotation locking mechanisms 80 and 400 are applied to the vehicle seat S that includes the vertically moving mechanism 50. However, the rotation locking mechanisms 80 and 400 can be applied to a vehicle seat that does not include the vertically moving mechanism 50. In this case, the lock releasing portion 380 may preferably be attached to the seat support base 75 of the first lateral sliding mechanism 70 or the seat main body 10.

Moreover, in the first and second embodiments, the passenger seat is exemplified as the vehicle seat S. However, seats other than the passenger seat can be used as the vehicle seat S.

The invention claimed is:
1. A vehicle seat, comprising:
a seat main body;
a rotation mechanism that is arranged and constructed to horizontally rotate the seat main body between a forwardly facing position and a laterally facing position;
a sliding mechanism that is arranged and constructed to move the seat main body toward vehicle exterior or vehicle interior relative to the rotation mechanism when the seat main body is in the laterally facing position; and a rotation locking mechanism that is arranged and constructed to prevent the seat main body from rotating when the seat main body is in the laterally facing position, wherein the rotation mechanism includes a support base that is unrotatably positioned on a vehicle floor, and a rotatable base that is rotatably coupled to the support base and is coupled to the sliding mechanism, wherein the sliding mechanism includes a slide portion that is coupled to the seat main body and is capable of sliding toward the vehicle exterior or the vehicle interior, wherein the rotation locking mechanism includes a first engagement portion that is attached to a side corresponding to the support base of the rotation mechanism, a second engagement portion that is attached to a side corresponding to the rotatable base of the rotation mechanism, and a lock releasing portion that is attached to the slide portion of the sliding mechanism, wherein the second engagement portion of the rotation locking mechanism is capable of moving between a position in which it does not engage the first engagement portion and a position in which it engages the first engagement portion when the seat main body is in the laterally facing position, and wherein the lock releasing portion of the rotation locking mechanism is arranged and constructed to be engaged with the second engagement portion to prevent rotation of the seat main body when the seat main body is moved toward the vehicle exterior, and disengaged from the second engagement portion to allow rotation of the seat main body when the seat main body is moved toward the vehicle interior.

2. The vehicle seat as defined in claim 1, wherein the rotation locking mechanism comprises a biasing member that is arranged and constructed to normally bias the second engagement portion such that the second engagement portion is capable of engaging the first engagement portion when the lock releasing portion is disengaged therefrom.

3. The vehicle seat as defined in claim 1, wherein the second engagement portion comprises a main body that is capable of engaging the first engagement portion, and a force transmission portion that is capable of engaging the lock releasing portion of the rotation locking mechanism.

4. The vehicle seat as defined in claim 3, wherein the force transmission portion is arranged and constructed to move the main body to an unlocking position thereof in which the main body does not engage the first engagement portion when the force transmission portion engages the lock releasing portion.

5. The vehicle seat as defined in claim 1, wherein the second engagement portion comprises a stationary member that is fixed to the rotatable base of the rotation mechanism, and a movable member that is capable of engaging the lock releasing portion of the rotation locking mechanism.

6. The vehicle seat as defined in claim 5, wherein the movable member is arranged and constructed to move to an unlocking position thereof in which the movable member does not engage the first engagement portion when the movable member engages the lock releasing portion.

* * * * *